United States Patent
Lee

(10) Patent No.: US 7,810,048 B2
(45) Date of Patent: Oct. 5, 2010

(54) METHOD AND APPARATUS FOR RETRIEVING INFORMATION FROM AN INFORMATION SOURCE

(76) Inventor: Yisia Young Suk Lee, 27 Sandilands Road, London (GB) SW6 2BD ( * ) Notice: Subject to any disclaimer, the term of this patent is extended or adjusted under 35 U.S.C. 154(b) by 78 days.

(21) Appl. No.: 11/413,059

(22) Filed: Apr. 28, 2006

(65) Prior Publication Data

US 2006/0265669 A1    Nov. 23, 2006

Related U.S. Application Data

(63) Continuation-in-part of application No. PCT/GB2004/004570, filed on Oct. 28, 2004.

(30) Foreign Application Priority Data

Oct. 28, 2003    (GB) ................................. 0325158.4

(51) Int. Cl.
*G06F 3/048* (2006.01)
(52) U.S. Cl. ................. 715/817; 715/818; 715/822; 715/841
(58) Field of Classification Search ......... 715/810, 715/764, 811, 827, 841, 854–855, 705, 712–713, 715/817–820, 822, 27, 829
See application file for complete search history.

(56) References Cited

U.S. PATENT DOCUMENTS

| | | | |
|---|---|---|---|
| 4,772,882 A | 9/1988 | Mical | |
| 5,297,253 A * | 3/1994 | Meisel | ........................ 715/854 |
| 5,469,540 A | 11/1995 | Powers, III et al. | |
| 5,546,529 A | 8/1996 | Bowers et al. | |
| 5,557,794 A | 9/1996 | Matsunaga et al. | |
| 5,559,945 A | 9/1996 | Beaudet et al. | |

(Continued)

FOREIGN PATENT DOCUMENTS

CN    1421800 A    6/2003

(Continued)

OTHER PUBLICATIONS

"IRiver Portable Storage Device & Multi-Codec Jukebox Model H140 Instruction Manual" IRiver America. http://www.iRiverAmerica.com.

(Continued)

*Primary Examiner*—Ba Huynh
*Assistant Examiner*—Enrique W Iturralde
(74) *Attorney, Agent, or Firm*—Dickstein Shapiro LLP

(57) ABSTRACT

Apparatus for displaying information from at least one information source, the information being arranged, labeled or indexed to define a hierarchical information structure, the apparatus comprising: a display controller for displaying information and user selectable menu items on at least one display, each menu item corresponding to a node of the information hierarchy or to information in the at least one information source. The display controller is configured such that during said navigation, in response to a user selection of a menu item from either one of the first or second display areas, a sub-set of menu items corresponding to sub-nodes and/or information in the information hierarchy at the level of the hierarchy below said selected menu item is displayed in the other of the second or first display areas.

25 Claims, 31 Drawing Sheets

U.S. PATENT DOCUMENTS

| | | |
|---|---|---|
| 5,615,346 A | 3/1997 | Gerken |
| 5,621,438 A | 4/1997 | Kamimura et al. |
| 5,623,589 A | 4/1997 | Needham et al. |
| 5,666,502 A | 9/1997 | Capps |
| 5,701,137 A | 12/1997 | Kiernan et al. |
| 5,704,051 A * | 12/1997 | Lane et al. .................. 715/855 |
| 5,768,578 A | 6/1998 | Kirk et al. |
| 5,845,261 A | 12/1998 | McAbian |
| 5,917,492 A | 6/1999 | Bereiter et al. |
| 5,970,471 A | 10/1999 | Hill |
| 5,983,180 A | 11/1999 | Robinson |
| 6,034,688 A | 3/2000 | Greenwood et al. |
| 6,101,512 A | 8/2000 | DeRose et al. |
| 6,133,898 A | 10/2000 | Ludolph et al. |
| 6,154,750 A | 11/2000 | Roberge et al. |
| 6,167,396 A | 12/2000 | Lokken |
| 6,247,020 B1 | 6/2001 | Minard |
| 6,281,896 B1 | 8/2001 | Alimpich et al. |
| 6,381,611 B1 | 4/2002 | Roberge et al. |
| 6,385,619 B1 | 5/2002 | Eichstaedt et al. |
| 6,449,624 B1 | 9/2002 | Hammack et al. |
| 6,452,609 B1 | 9/2002 | Katinsky et al. |
| 6,462,760 B1 | 10/2002 | Cox, Jr. et al. |
| 6,476,825 B1 * | 11/2002 | Croy et al. .................. 715/716 |
| 6,480,188 B1 | 11/2002 | Horsley |
| 6,593,944 B1 | 7/2003 | Nicolas et al. |
| 6,615,248 B1 | 9/2003 | Smith |
| 6,691,282 B1 | 2/2004 | Rochford et al. |
| 6,756,997 B1 | 6/2004 | Ward, III et al. |
| 6,791,587 B1 | 9/2004 | Bamford et al. |
| 6,816,175 B1 | 11/2004 | Hamp et al. |
| 6,842,653 B2 * | 1/2005 | Weishut et al. ................ 700/83 |
| 6,879,332 B2 | 4/2005 | Decombe |
| 6,968,512 B2 | 11/2005 | Duxbury |
| 7,017,122 B1 | 3/2006 | Lee et al. |
| 7,058,905 B2 | 6/2006 | Guerrero |
| 7,069,521 B2 | 6/2006 | Geisler et al. |
| 7,243,299 B1 | 7/2007 | Rubin et al. |
| 7,284,204 B2 | 10/2007 | Lee |
| 2001/0030667 A1 | 10/2001 | Kelts |
| 2002/0004408 A1 | 1/2002 | Masuda et al. |
| 2002/0030703 A1 | 3/2002 | Robertson et al. |
| 2002/0035579 A1 | 3/2002 | Wang et al. |
| 2002/0054134 A1 | 5/2002 | Kelts |
| 2002/0054152 A1 | 5/2002 | Palaniappan et al. |
| 2002/0059210 A1 | 5/2002 | Makus et al. |
| 2002/0097274 A1 | 7/2002 | Morgan |
| 2002/0152222 A1 | 10/2002 | Holbrook |
| 2002/0165940 A1 | 11/2002 | Kameoka et al. |
| 2003/0001903 A1 | 1/2003 | Duffy |
| 2003/0018714 A1 | 1/2003 | Mikhailov et al. |
| 2003/0046082 A1 | 3/2003 | Siegel |
| 2003/0050906 A1 | 3/2003 | Clifton-Bligh |
| 2003/0074635 A1 | 4/2003 | Cao |
| 2004/0221245 A1 | 11/2004 | Chickles et al. |
| 2005/0108657 A1 * | 5/2005 | Han ........................... 715/827 |
| 2006/0184897 A1 | 8/2006 | Lee |
| 2006/0190842 A1 | 8/2006 | Lee |
| 2008/0016459 A1 * | 1/2008 | Mann et al. ................. 715/781 |
| 2009/0172603 A1 | 7/2009 | Lee |

FOREIGN PATENT DOCUMENTS

| | | |
|---|---|---|
| EP | 0 623 870 A2 | 11/1994 |
| EP | 0 689 133 A2 | 12/1995 |
| EP | 0 704 675 A2 | 4/1996 |
| EP | 0 717 344 A1 | 6/1996 |
| EP | 0 717 346 A2 | 6/1996 |
| EP | 0 994 406 A2 | 4/2000 |
| GB | 2 354 142 A | 3/2001 |
| JP | 8-36512 A | 2/1996 |
| JP | 2000-11000 A | 1/2000 |
| JP | 2003-16085 A | 1/2003 |
| JP | 2003-108601 A | 4/2003 |
| KR | 10-2000-0058356 A | 10/2000 |
| KR | 10-2001-0067115 A | 7/2001 |
| KR | 2002-0000177 A | 1/2002 |
| KR | 2002-0025720 A | 4/2002 |
| KR | 10-2003-0051577 A | 6/2003 |
| WO | WO 00/79374 A1 | 12/2000 |
| WO | WO 02/37251 A1 | 5/2002 |

OTHER PUBLICATIONS

Wiindows NT 4.0 fur Anwender, Universitat Hannover, Germany, Jan. 1997.

Chinese Office Action dated Jun. 12, 2009 (CN Appln. 200480035062.0), w/ translation.

* cited by examiner

| Name ▲ | Size | Type | Date Modified |
|---|---|---|---|
| ecology-amphibians-image.swf | 4 KB | Flash Movie | 28/07/2004 10:52 |
| ecology-birds-image.swf | 4 KB | Flash Movie | 28/07/2004 10:47 |
| ecology-fishes-image.swf | 5 KB | Flash Movie | 28/07/2004 10:48 |
| ecology-image.swf | 4 KB | Flash Movie | 28/07/2004 10:40 |
| ecology-insect-image.swf | 5 KB | Flash Movie | 28/07/2004 10:49 |
| ecology-mammal-carnivora-image.swf | 4 KB | Flash Movie | 28/07/2004 10:53 |
| ecology-mammal-catacea-blue_whale-behaviour-image.swf | 2 KB | Flash Movie | 28/07/2004 11:08 |
| ecology-mammal-catacea-blue_whale-classification-image.swf | 2 KB | Flash Movie | 28/07/2004 11:08 |
| ecology-mammal-catacea-blue_whale-description-image.swf | 2 KB | Flash Movie | 28/07/2004 11:09 |
| ecology-mammal-catacea-blue_whale-image.swf | 4 KB | Flash Movie | 28/07/2004 11:01 |
| ecology-mammal-catacea-blue_whale-recognition_at_sea-image.swf | 2 KB | Flash Movie | 28/07/2004 11:09 |
| ecology-mammal-catacea-bowhead_whale-image.swf | 5 KB | Flash Movie | 28/07/2004 11:02 |
| ecology-mammal-catacea-brydes_whale-behaviour-image.swf | 2 KB | Flash Movie | 28/07/2004 11:08 |
| ecology-mammal-catacea-brydes_whale-classification-image.swf | 2 KB | Flash Movie | 28/07/2004 11:08 |
| ecology-mammal-catacea-brydes_whale-description-image.swf | 2 KB | Flash Movie | 28/07/2004 11:09 |
| ecology-mammal-catacea-brydes_whale-image.swf | 5 KB | Flash Movie | 28/07/2004 11:02 |
| ecology-mammal-catacea-brydes_whale-recognition_at_sea-image.swf | 2 KB | Flash Movie | 28/07/2004 11:09 |
| ecology-mammal-catacea-fin_whale-image.swf | 5 KB | Flash Movie | 28/07/2004 11:03 |
| ecology-mammal-catacea-gray_whale-image.swf | 4 KB | Flash Movie | 28/07/2004 11:04 |
| ecology-mammal-catacea-humpback_whale-image.swf | 4 KB | Flash Movie | 28/07/2004 11:04 |
| ecology-mammal-catacea-image.swf | 4 KB | Flash Movie | 28/07/2004 10:54 |
| ecology-mammal-catacea-minke_whale-image.swf | 4 KB | Flash Movie | 28/07/2004 11:05 |
| ecology-mammal-catacea-northern_right_whale-image.swf | 5 KB | Flash Movie | 28/07/2004 11:05 |
| ecology-mammal-catacea-sei_whale-image.swf | 5 KB | Flash Movie | 28/07/2004 11:06 |
| ecology-mammal-chiroptera-image.swf | 4 KB | Flash Movie | 28/07/2004 10:55 |
| ecology-mammal-condylarthra-image.swf | 3 KB | Flash Movie | 28/07/2004 10:55 |
| ecology-mammal-creodonta-image.swf | 4 KB | Flash Movie | 28/07/2004 10:56 |
| ecology-mammal-image.swf | 5 KB | Flash Movie | 28/07/2004 10:50 |
| ecology-mammal-insectivoca-image.swf | 4 KB | Flash Movie | 28/07/2004 10:57 |
| ecology-mammal-lagomorpha-image.swf | 4 KB | Flash Movie | 28/07/2004 10:57 |
| ecology-mammal-macroscelidea-image.swf | 4 KB | Flash Movie | 28/07/2004 10:58 |
| ecology-mammal-pholidota-image.swf | 4 KB | Flash Movie | 28/07/2004 10:59 |
| ecology-mammal-primates-image.swf | 3 KB | Flash Movie | 28/07/2004 10:59 |
| ecology-mammal-rodentia-image.swf | 5 KB | Flash Movie | 28/07/2004 11:00 |
| ecology-mammal-xenarthra-image.swf | 5 KB | Flash Movie | 28/07/2004 11:00 |
| ecology-plant-image.swf | 4 KB | Flash Movie | 28/07/2004 10:51 |

Figure 27

METHOD AND APPARATUS FOR RETRIEVING INFORMATION FROM AN INFORMATION SOURCE

CROSS-REFERENCE TO RELATED APPLICATIONS

This application is a continuation-in-part of PCT/GB2004/004570, filed Oct. 28, 2004, which claims priority to Great Britain Application No. 0325158.4, filed Oct. 28, 2003.

FIELD OF THE INVENTION

The present invention relates to an apparatus and method for information retrieval and display, and in particular, to an apparatus and method for accepting user selection of information and outputting the selected information.

BACKGROUND OF THE INVENTION

Information may often be conveniently indexed using a hierarchical directory structure. It is desirable to make it easy for a user to navigate through the hierarchical directory structure to locate information of interest to the user, and to provide an efficient menu based navigation system.

Alternatively, information may be indexed or arranged using an indexing system or arrangement that defines an information hierarchy. For example, each item of information may be associated with a label or definition, defining its location in the hierarchical structure. The information may comprise data files, and the filenames and/or information stored within the files may define the location of each file in the hierarchical structure. Alternatively, an index that is separate from the files, e.g. in the form of a list, may be provided, in order to define the hierarchical structure.

The defined information hierarchy may be independent from any storage hierarchy of data files or directories on the data storage device(s). Data files may be stored using a non-hierarchical storage arrangement or a storage arrangement that is only partly hierarchical. For example, the data files may all be contained within a single directory on a disk drive or other storage means, or within several directories that have no direct hierarchical relationship, e.g. in different network locations. In this case, an information hierarchy may be set up by providing information defining the hierarchy, e.g. stored within each data file or stored separately. Alternatively, data files may be stored using a hierarchical storage structure. This storage structure may be used to define a hierarchy for navigation of the information, or else a separate independent hierarchy may be defined, e.g. as described above. It is desirable to make it easy for a user to navigate through a hierarchy of information organised in such a way.

SUMMARY OF THE INVENTION

One aspect of the present invention provides a method and apparatus for displaying information from at least one information source. The information source or sources may include hierarchically arranged information, for example, information that is arranged by a disk filing system to define a hierarchical information structure, or information that is arranged, labelled or indexed in any other way to define an information hierarchy. At least one display is used for displaying user selectable menu items and information. Each menu item may correspond to a directory in a directory structure, a level or part of a level of a defined information hierarchy that may be independent from the storage location of data files or information from the information source. A user input device is used to receive user selections of displayed menu items.

A display controller is used to control the at least one display to provide a first display area for a first set of menu items and a second display area for a second set of menu items. A user may navigate through at least part of the information hierarchy by selecting menu items to navigate through the information hierarchy and locate the information to be displayed. The display controller is configured to display a new set of menu items in one display area in response to a user selection of a menu item from the other display area, where the new set of menu items is for directories and/or information at the level of the hierarchy below the selected menu item.

In a further aspect of the invention, it is not essential that a complete information hierarchy is defined. In this aspect, for displayable menu items, the user interface apparatus can identify any sub menu items or data objects that are to be displayed on selection of one of the displayable menu items. This identification may be using file association data stored in each file in the information store or data from which such files associations are derivable, or may be using a list of associations between data files, or a list from which such associations are derivable. In this aspect of the invention, non-hierarchical information may also be used, provided that sufficient associations between the files are defined. For example, such non-hierarchical information may include information in which navigation down through the sub menus of the menu system leads back to the starting point, or to a file system including links between data files at any part of an otherwise hierarchical information structure.

Thus the present invention provides a user interface which allows for easy navigation of information using a menu system, where new menus are alternately displayed in one or other of two display areas.

The apparatus may be configured to display a sub-set of menu items at the same time as displaying the set of menu items including the selected menu item. The apparatus may also be configured to display the selected menu item in a highlighted manner.

An embodiment of the present invention has the advantage that it allows two menus to be simultaneously displayed on the display. When a menu item is selected from either of the two display areas, a new sub-menu may be displayed in the other display area, containing menu items at the next lowest level of the hierachy and/or information located within the level of the hierarchy corresponding to the selected menu item. This allows the menu from which the selection was made to continue to be displayed. A user can therefore easily keep track of which menu selection they have just made, and the user can also change their mind and select an alternative menu item from the menu, without having to spend extra time to navigate back in the hierarchy.

By maintaining a constant position on the screen for the selected menu item and for the other menu items in the same menu, a user will be able to see at a glance which selection they have just made. If these screen positions were changed, the user would have to spend more time looking at the screen to see which item they had just selected. Thus the embodiment provides the user with greater ease of navigation through the information hierarchy. The display controller may be configured such that the first and second display areas have a fixed size, which may aid their readability when switching between menus. A menu being replaced may then be completely overwritten when a new menu is displayed in one of the display areas.

An embodiment of the present invention also displays a preview image for at least some of the menu items in the menu structure, and allows a user to access the next hierarchical level of the menu structure by selection of the preview image. The preview image may occupy the whole of the first or second display area, thus giving a relatively large and clear preview image.

A preview may be shown for every menu item if a preview is available for every menu item. If a preview is available for only some of the menu items, a preview may be displayed for these menu items. For those menu items having no preview, a default image may be displayed in place of a preview, for example, an image relating generally to the information source. Alternatively, the preview screen may be omitted for menu items not having a preview, and the next sub menu may simply be displayed instead.

One embodiment of the invention uses only two display areas, and in this embodiment the total area of the display is used and re-used very efficiently, whilst at the same time improving the ease of the navigation process. Thus this embodiment is particularly suitable for small sizes of display screens, such as those on handheld computer devices. This advantage may still be obtained, even if to a lesser extent, if a larger number of display areas is used, provided that the number of display areas is not sufficiently large that each display area is too small to read and operate easily. For example, the invention may be used with three display areas, where the third display area is used for displaying preview images, and the first and second display areas are used to display the menu items.

The present invention may be used with any computer, including handheld devices such as PDAs (personal digital assistants), electronic book readers, mobile phones, digital audio players, GPS (global positioning satellite) receivers, etc. Where the present invention is used with a computer having a small screen, such as in a handheld device, an embodiment of the invention provides the considerable advantage of allowing very efficient use of the limited display area available on the screen.

The information in the information source(s) may include any type of data. For example, the information may include text, web pages, photographs, images or video images for displaying on a screen, other types of multimedia information and/or audio information, such as digital speech or music, for outputting through a speaker. The information may include applications or applets, e.g. interactive applets embedded in a web page or independently displayable applications. The information may be physically stored as an information hierarchy, or indexed by a hierarchical node structure. At least some of the information may be generated dynamically when a user input is received to navigate to that information. Such dynamically generated information may be accessed from one or more physical location.

The information may all be stored in a single physical location, such as a disc drive, or may be distributed amongst a plurality of physical locations, which may be connectable via one or more networks. The information may be stored within a directory structure which at least partially corresponds to the structure of the information hierarchy, e.g. information at the top level of the hierarchy may be stored in top level directories, and information at lower levels of the hierarchy may be stored in subdirectories. Alternatively, the information may be stored within a file structure that does not correspond to the structure of the information hierarchy. One example is where the information in the information source is all stored within a single directory, and the hierarchical information structure is defined by indexing means such as by filenames or labels associated with each file in the information source, or by using an index or list containing information on the hierarchical structure.

For example, a first part of the filename or label may define a position in the hierarchy, a second part of the filename or label may define a branch of the hierarchy below the first defined position, and subsequent parts of the filename or label may define sub-branches of the hierarchy. Thus, the filename or label may specify the route from the top of the hierarchy to the location of the named or labelled information within the hierarchy. An information source may be constructed of a plurality of files stored within a single directory on a computer storage device, or stored in distributed physical locations or virtual locations, and the hierarchical structure be defined by associated filenames or labels. Part of the filename or label may relate to the position of the file in the hierarchy, or the entire filename or label may determine this.

The labelling to define a hierarchy can easily be processed by computer programming languages, e.g. XML (Extensible markup language), PHP (PHP Hypertext Pre-processor) and SQL (Structured Query Language), which may thus be used to identify the next item of information to be retrieved when a user selects a menu item.

The information source(s) may be provided on a computer, together with code for configuring the computer as an apparatus according to the present invention, or the information source(s) may be separate or remote from the apparatus, whereby the information is accessed by the apparatus e.g. over a communications link. Alternatively the information may be provided separately or remotely from the apparatus and the apparatus accesses the information e.g. over a network.

The information source(s) may include information which is arranged in a hierarchical structure corresponding to a network of hierarchically interlinked nodes. The individual items of information making up the information source are each associated with a node. The structure may have a single top level node or "root" node, which is interlinked to each node lower in the hierarchy. The top level node may be interlinked to each node lower in the hierarchy via a unique path, or via a choice of alternative paths. Each node may be associated with a node reference which is used to identify the node, such as a node name, label or ID number.

The information hierarchy may be a tree-type structure. Alternatively, the information hierarchy may include multiple paths between a selected node of the hierarchy and a node at a higher level in the hierarchy. For instance, in a hierarchy with top level "photos", second level "Joe" and "Peter", a photograph of both Joe and Peter may be accessible from either of the nodes on the second level.

The apparatus of the invention may include a touch sensitive screen, which may be selected using a variety of methods, such as by a person's finger or using a stylus. The apparatus may include a loudspeaker, for playback of audio information. However, the present invention is not limited to such a technology or design.

Menu items may be selected using a pointer displayed on the display, for example, a pointer linked to a mouse or other input device. Alternatively, menu items may be selected without a pointer being displayed on the screen, e.g. by use of a touch sensitive screen, and a user touching the part of the screen corresponding to the menu item. Menus may be selected and items selected by the positioning of the pointer on the screen, and/or by clicking the pointer, or by single or multiple touches to a touch sensitive screen.

The information source and/or directory structure may be provided on a computer, together with code for configuring the computer as an apparatus according to the present invention, or the information source and/or directory structure may be separate or remote from the apparatus, whereby the information is accessed by the apparatus e.g. over a communications link. Alternatively the information may be provided separately or remotely from the apparatus and the apparatus may accesse the information e.g. over a network or communications link.

The information source may include information which is arranged in a network of hierarchically interlinked nodes. The individual items of information making up the information source are each associated with a node. The structure may have a single top level node, which is interlinked to each node lower in the hierarchy. The top level node is interlinked to each node lower in the hierarchy via a unique path, or via a choice of alternative paths. Each node may be associated with a node reference which is used to identify the node, such as a node name, label or ID number.

Menu items may each be displayed in an allocated area of the display, arranged in a series, for example, in a series of boxes displayed on the screen.

The present invention can be implemented by software or programmable computing apparatus. This includes any computer, including PDAs (personal digital assistants), mobile phones, etc. Thus the present invention encompasses a storage medium carrying computer readable code for configuring a computer or number of computers as the apparatus of the invention. The storage medium can comprise a carrier medium such as a floppy disk, CD ROM, hard disk, or programmable memory device.

BRIEF DESCRIPTION OF THE DRAWINGS

Embodiments of the present invention will now be described, by way of example only, with reference to the accompanying drawings, in which:

FIG. 27 is a computer screenshot displaying the contents of a single directory in a computer file system, comprising files corresponding to a plurality of levels of the hierarchy, in another embodiment of the invention;

DETAILED DESCRIPTION OF THE INVENTION

Figure 1:
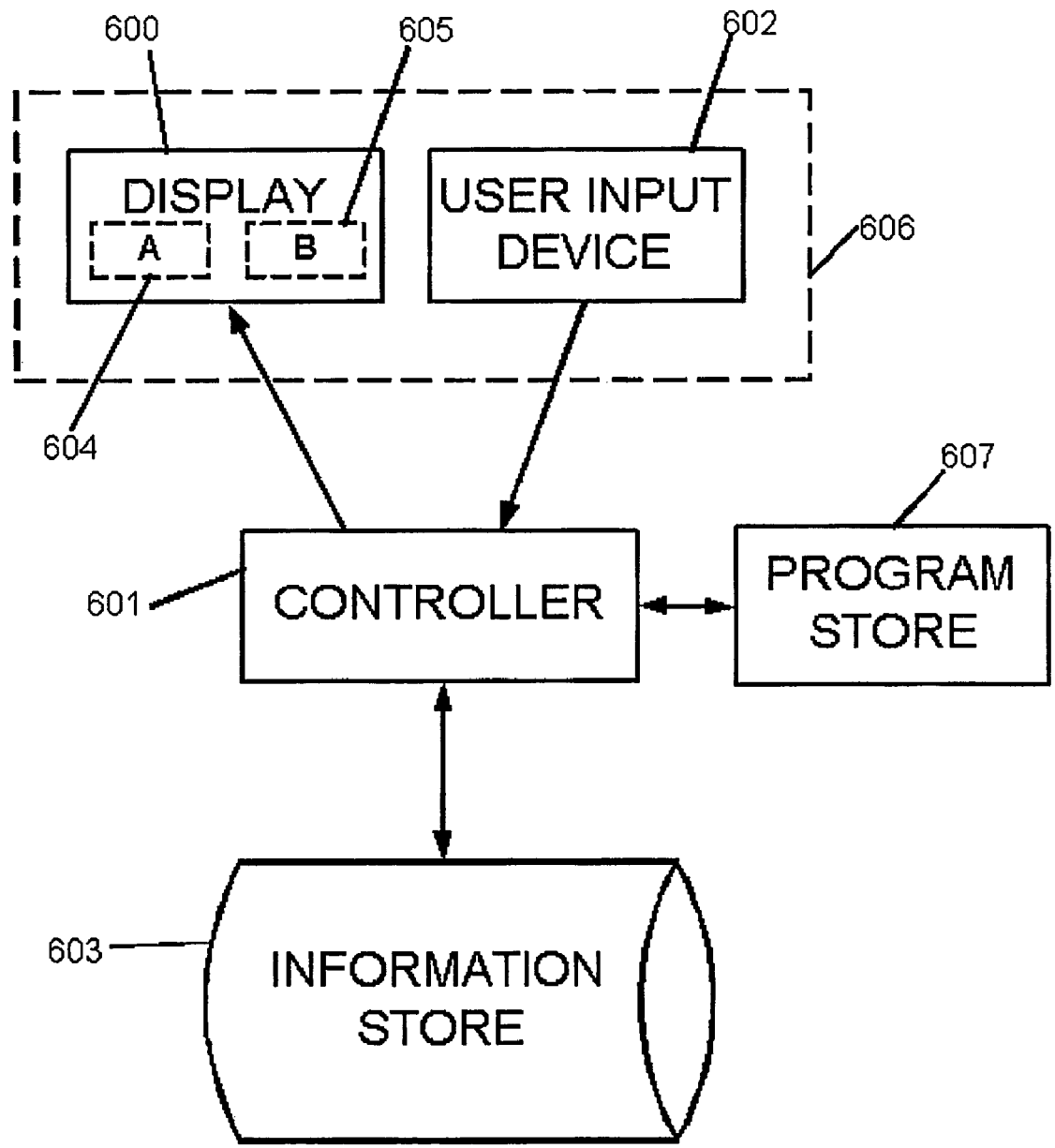
FIG. 1 is a block diagram showing the apparatus according to an embodiment of the invention.

FIG. 1 is a block diagram showing an apparatus according to an embodiment of the invention. The apparatus has a display 600, a controller 601 for controlling the display, a user input device 602, and an information store 603 which functions as an information source, and which stores the hierarchical directory structure with which the information is indexed. The apparatus may comprise any computing device, including handheld computing devices. For example, the apparatus may comprise an internet enabled PC, a set top box with a TV, a PDA (personal digital assistant), an electronic book reader, a mobile phone, a digital audio player, a GPS (global positioning satellite) receiver, etc. The invention is ideal for use with a limited display area.

The display may be a computer screen for use with the computing device. The user input device may be a keyboard, keypad, mouse, pen, trackpad, trackerball or other pointer device, touch sensitive screen or any other device for allowing a user to input information to the apparatus. The information store may comprise a disk such as a hard disk, floppy disk, CD, DVD, optical disk, etc, and the information store may be provided as part of the computing device, or it may be remote from the computing device and accessible via a communications link or a network. The information store 603 may comprise a single physical storage device, or may comprise a plurality of storage devices located at one or more locations, e.g. several computers on the internet. The information store 603 may be of a read-only type or may be of a read-write type. In the case of a read-write type of information store, some or all of the information may be write protected.

The display 600 and the user input device 602 are both connected to the controller 601, such that information passes from the controller 601 to the display 600, and from the user input device 602 to the controller 601. The information store 603 is connected to the controller 601 to allow information requests to pass from the controller 601 to the information store 603, and information to pass from the information store 603 to the controller 601, for subsequent display on the display 600. The user input device 602 may be integral with the display 600, or may be separate, as indicated by the dashed line 606 surrounding both the display 600 and the user input device 602. The user input device could be integral by being a touch sensitive mechanism provided on the display.

The display controller 601 is configured to control two display areas 604 and 605 on the display 600. These display areas 604, 605 are labelled A and B. The display 600 may have two physically separate screens, or the display may have a single screen which is configured to operate as two display areas by the controller 601 during at least part of the navigation process. The controller 601 loads and implements program code stored in the program memory 607 to control the display 600 and the user input device 602 to access the information store 603.

FIGS. 2A-G show an example of a hierarchical directory structure used for indexing information from the information source.

Figure 2A:
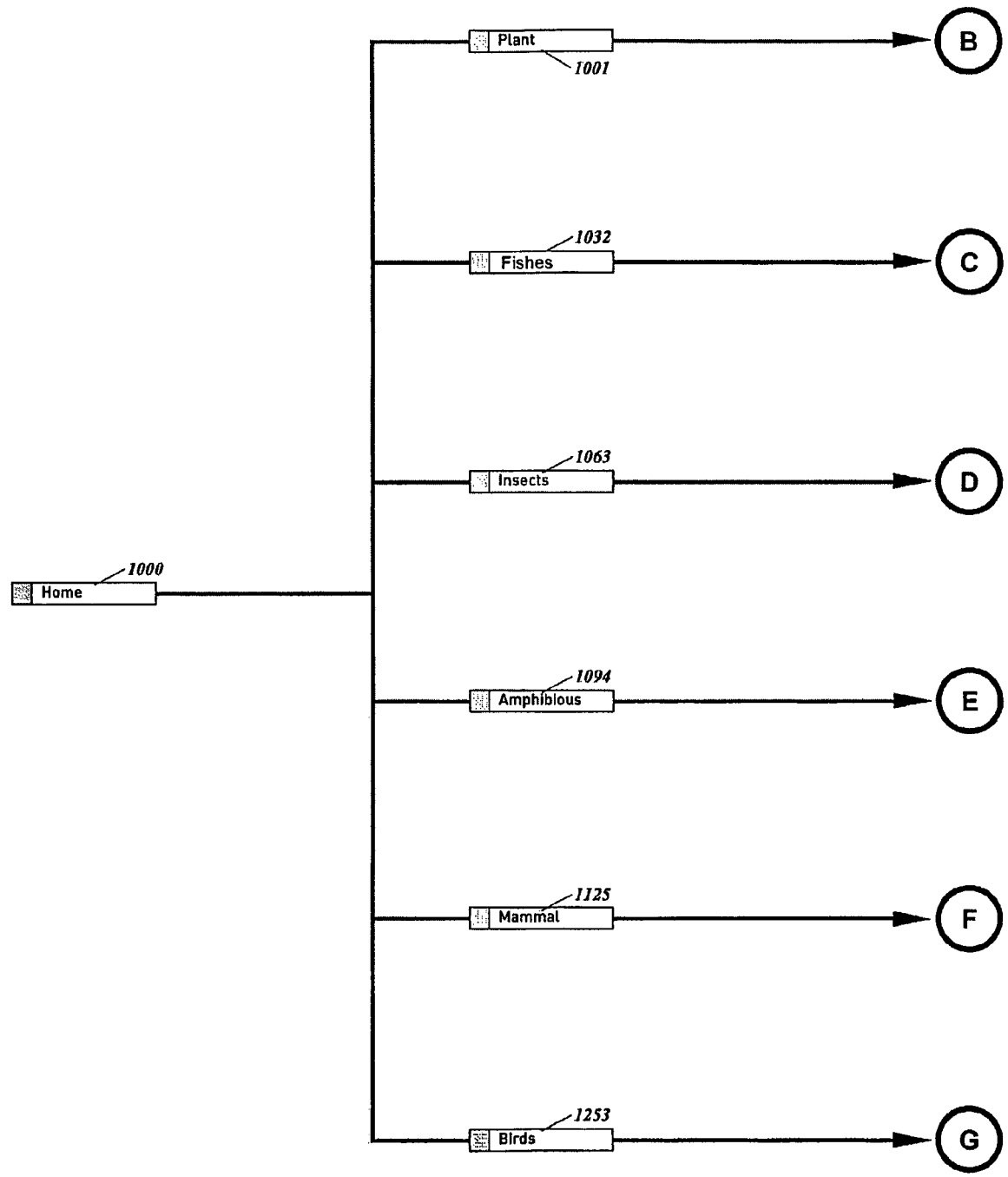
FIGS. 2A to 2G are sections of a tree diagram showing an example of a directory structure used to index the information in an information source used in a first embodiment of the invention.

FIG. 2A shows the upper part of the hierarchical structure. A tree-like network of lines is shown, to indicate the relationship between directories in the hierarchy. The top level directory 1000 is entitled "home". It has six subdirectories, which are "Plant" 1001, "Fishes" 1032, "Insects" 1063, "Amphibious" 1094, "Mammal" 1125 and "Birds" 1253. Each of these six subdirectories has a branch of subdirectories of its own. The labels B, C, D, E, F and G respectively indicate the branches into which each part of the hierarchical structure continues.

Figure 2B:
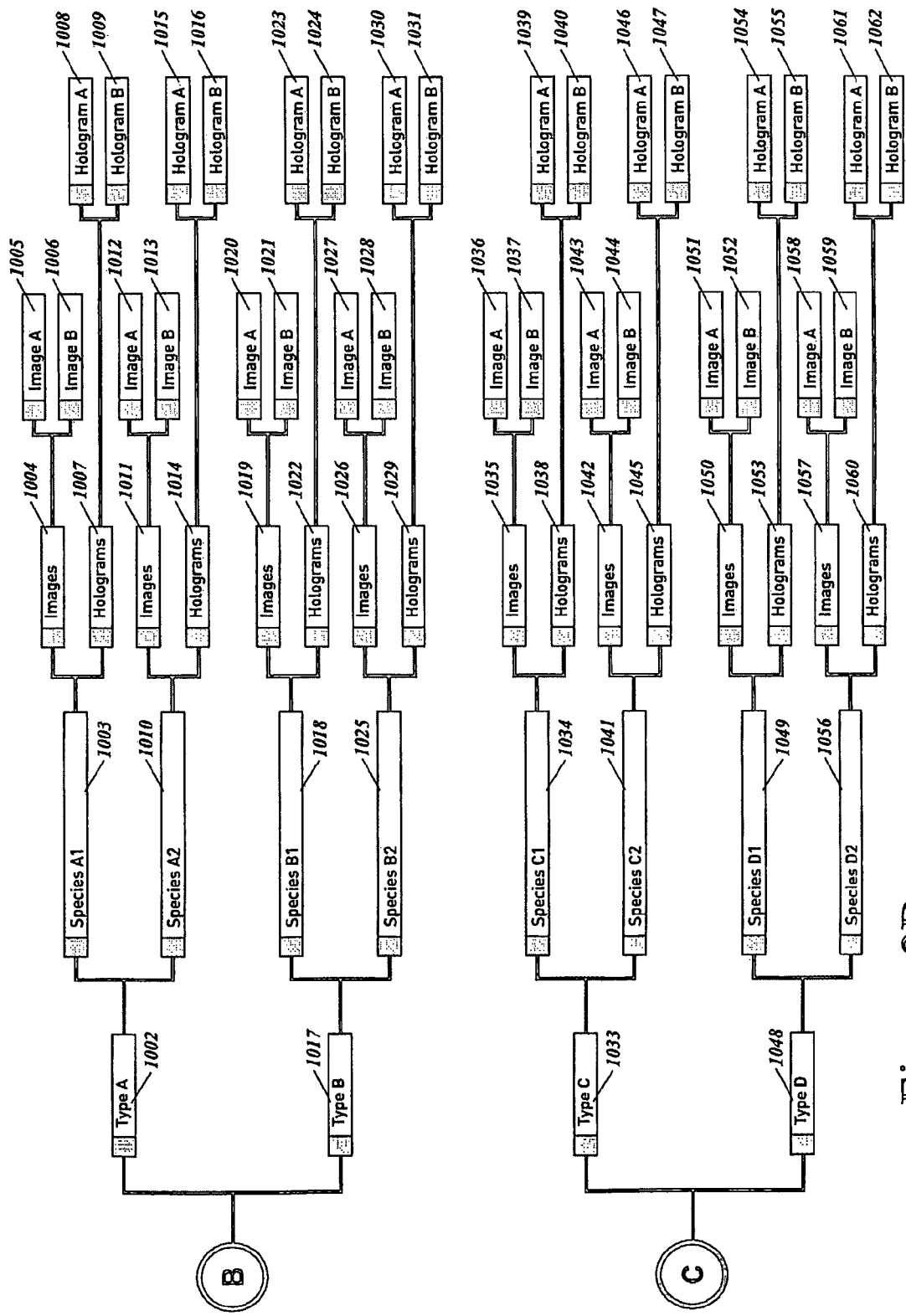

FIG. 2B shows a continuation of the structures for the "plant" 1001 and "fishes" 1032 directories. Labels B and C are shown to indicate each branch. The "plant" 1001 directory has subdirectories "Type A" 1002 and "Type B" 1017. "Type A" 1002 has subdirectories "Species A1" 1003 and "Species A2" 1010. "Type B" 1017 has subdirectories "Species B1" 1018 and "Species B2" 1025.

The "Fishes" 1032 directory has a similar structure, with two sub-directories. The subdirectories are "Type C" 1033 and "Type D" 1048. Each subdirectory has two directories for species, labelled with the corresponding letter, i.e. "Species C1" 1034, "Species C2" 1041, "Species D1" 1049, "Species D2" 1056.

Each of the species directories has a subdirectory for "images" and a subdirectory for "holograms". The image subdirectories each contain two image files, and the hologram subdirectory each contain two hologram files. A hologram file may be a rotating 3D image, which gives a three dimensional view of the animal shown.

Figure 2C:
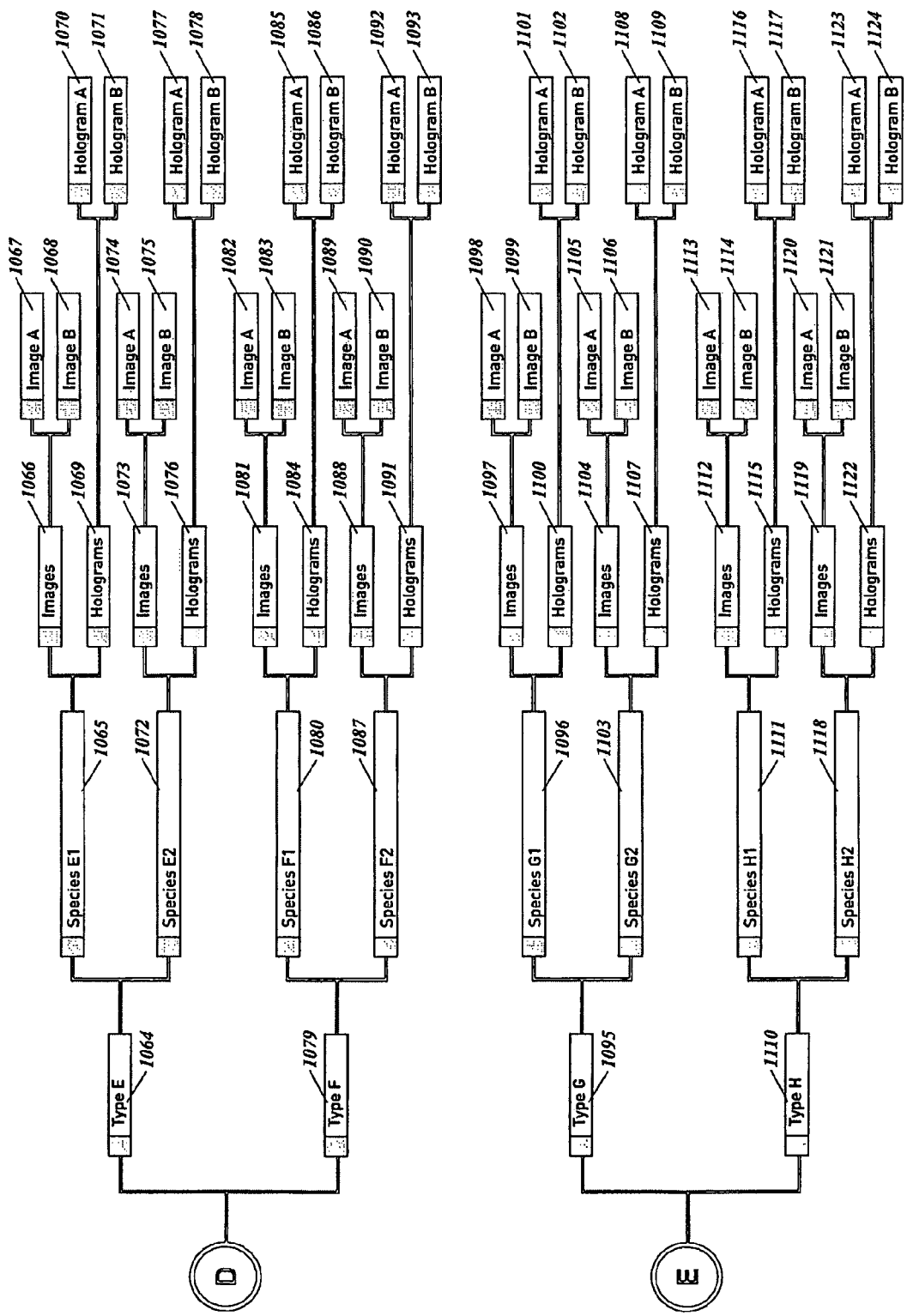

FIG. 2C shows a continuation of the structures shown in FIG. 2A, for the "insects" 1063, and "amphibious" 1094 directories. Labels D and E are shown to indicate each branch. The "Insects" 1063 and "Amphibious" 1094 directories have a similar structure to the "Plant" and "Fishes" structures shown in FIG. 2B, with two sub-directories each. The subdirectories are "Type E" 1064 and "Type F" 1079, "Type G" 1095 and "Type H" 1110, respectively. Each subdirectory has two directories for species, labelled with the corresponding letter, i.e. "Species E1" 1065, "Species E2" 1072, "Species F1" 1080, "Species F2" 1087, "Species G1" 1096, "Species G2" 1103, "Species H1" 1111, "Species H2" 1118. Each of the species directories has a subdirectory for "images" and a subdirectory for "holograms". The image subdirectories each contain two image files, and the hologram subdirectory each contain two hologram files.

Figure 2D:
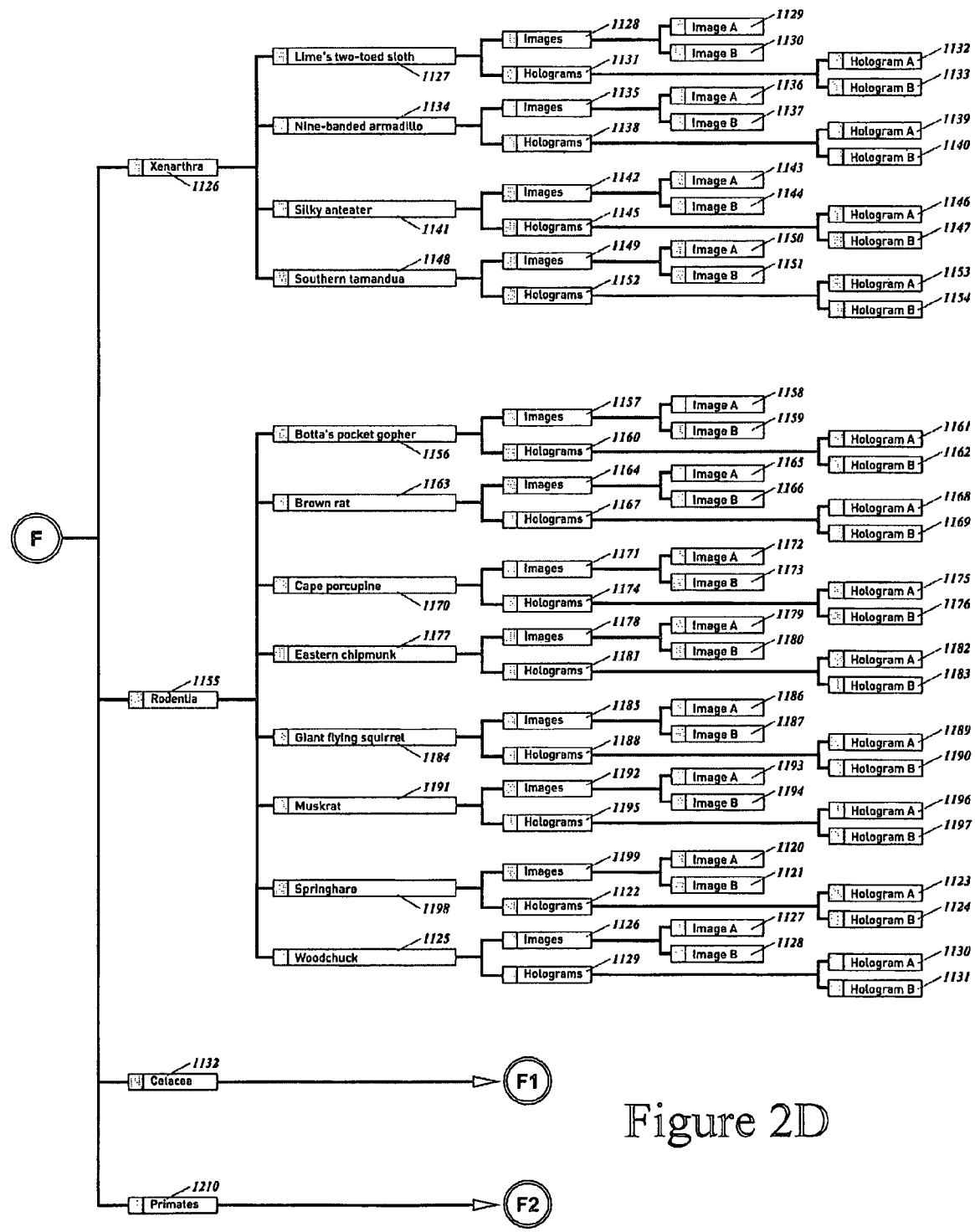

FIG. 2D shows a continuation of the directory structure for the "mammal" 1125 directory, which is marked with label F. The mammal directory has four subdirectories, which are "Xenarthta" 1126, "Rodentia" 1155, "Cetacea" 1132 and "Primates" 1210. The structure of the "Cetacea" 1132 and "Primates" 1210 directories are continues in FIGS. 2E and 2F, as indicated by the labels F1 and F2.

The "Xenarthra" 1126 directory has the subdirectories "Lime's two-toed sloth" 1127, "Nine banded armadillo" 1134, "Silky anteater" 1141 and "Southern tamandua" 1148. "Rodentia" 1155 has subdirectories "Botta's pocket gopher" 1156, "Brown Rat" 1163, "Cape porcupine" 1170, "Eastern Chipmunk" 1177, "Giant Flying Squirrel" 1184, "Muskrat" 1191, "Springhare" 1198 and "Woodchuck" 1225. Each of these has a subdirectory for images and a subdirectory for holograms. Again, each image directory has two image files and each hologram directory has two hologram files.

Figure 2E:
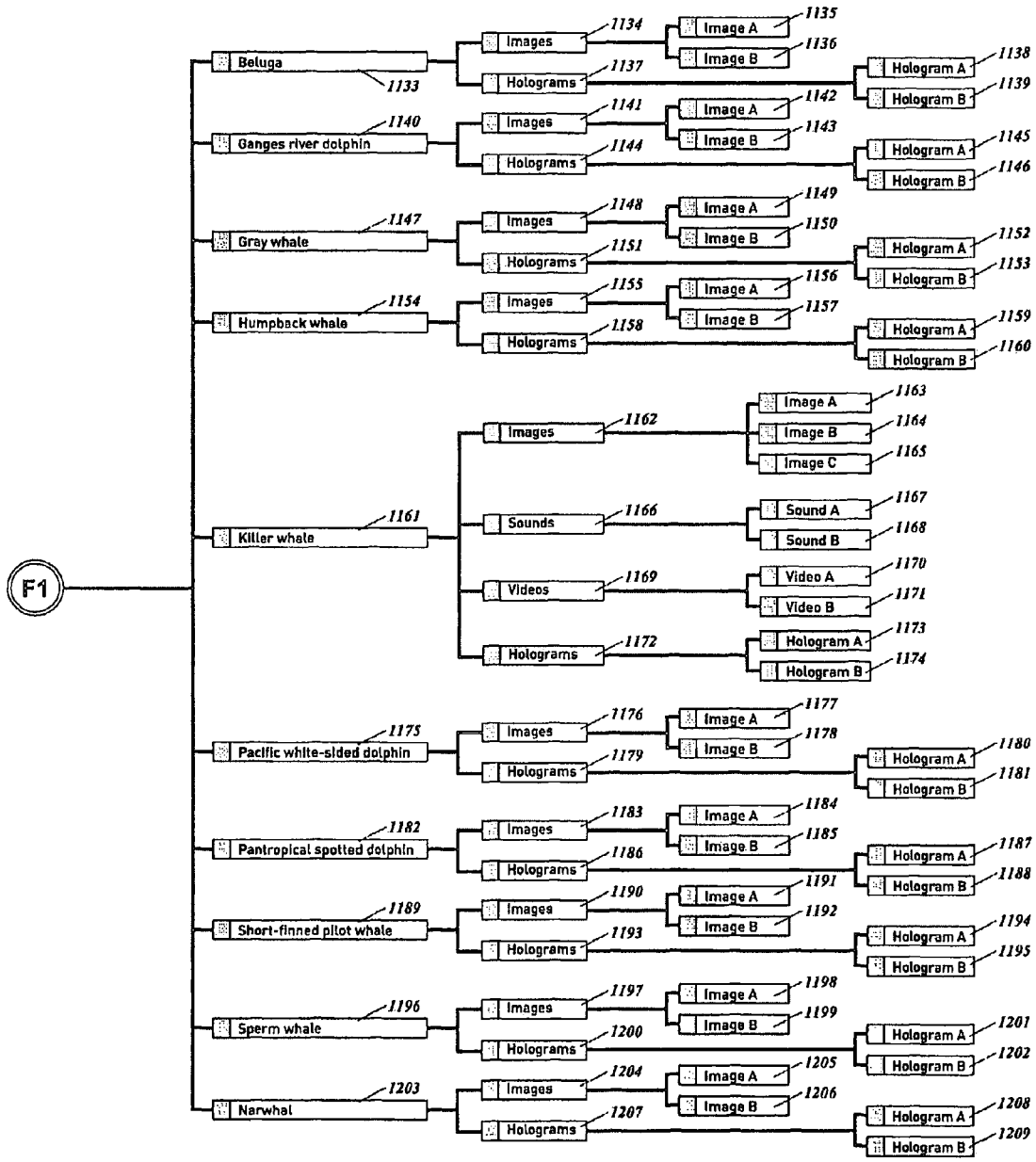

FIG. 2E shows the subdirectories of the "cetacea" 1132 directory, which are "Beluga" 1133, "Ganges river Dolphin" 1140, "Gray Whale" 1147, "Humpback Whale" 1154, "Killer Whale" 1161, "Pacific white-sided dolphin" 1175, "Pantropical spotted dolphin" 1182, "Short-finned pilot whale" 1189, "Sperm Whale" 1196 and "Narwhale" 1203. Each has subdirectories for images and holograms, and each of these subdirectories has two image and two hologram files, apart from the "Killer Whale"/"Images" 1162 directory, which has three images. The "Killer Whale" 1161 directory also has subdirectories for "Sounds" 1166 and "Videos" 1169, each containing two sound or video files.

Figure 2F:
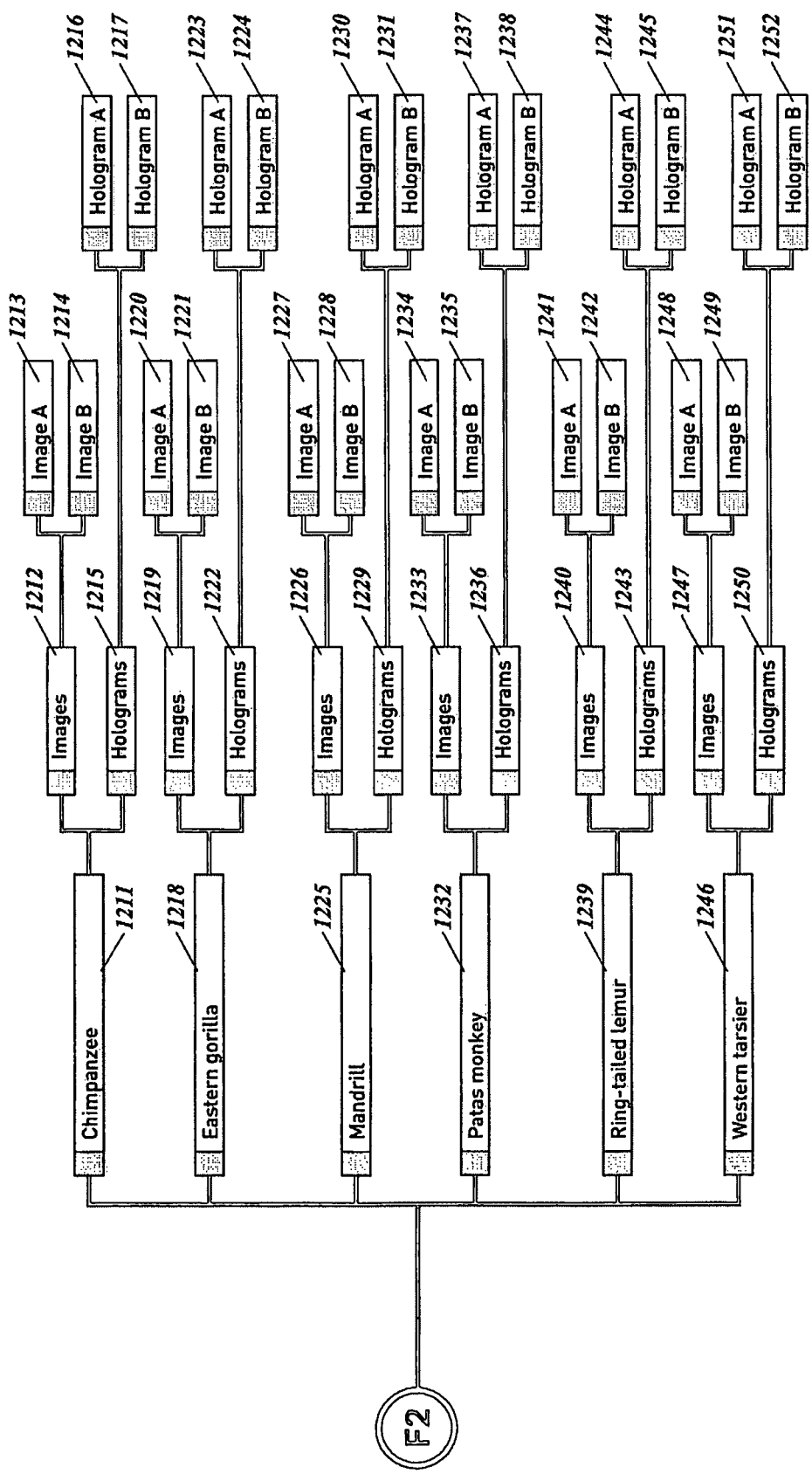

FIG. 2F shows the subdirectories of the "Primates" 1210 directory, which are "Chimpanzee" 1211, "Eastern Gorilla" 1218, "Mandrill" 1225, "Patas monkey" 1232, "Ring-tailed lemur" 1239 and "Western tarsier" 1246. Again, each has an images and a holograms subdirectory. The image subdirectories each contain two image files, and the hologram subdirectory each contain two hologram files.

Figure 2G:
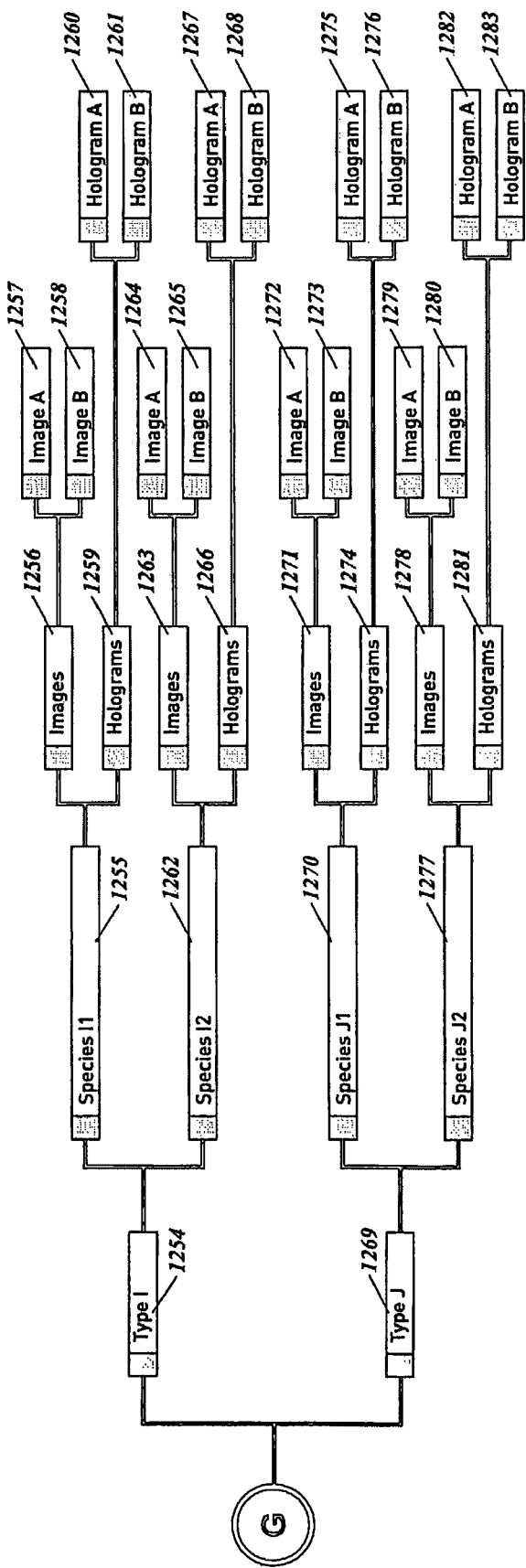

FIG. 2G shows the subdirectories of the "Birds" 1253 directory, the directory structure being indicated by the label G on FIG. 2A. The subdirectories are "Type I", with subdirectories "Species 11" and "Species 12", and "Type J" with subdirectories "Species J1" and "Species J2". The species subdirectories each have an image and a hologram subdirectory. The image subdirectories each contain two image files, and the hologram subdirectory each contain two hologram files.

Figure 3:
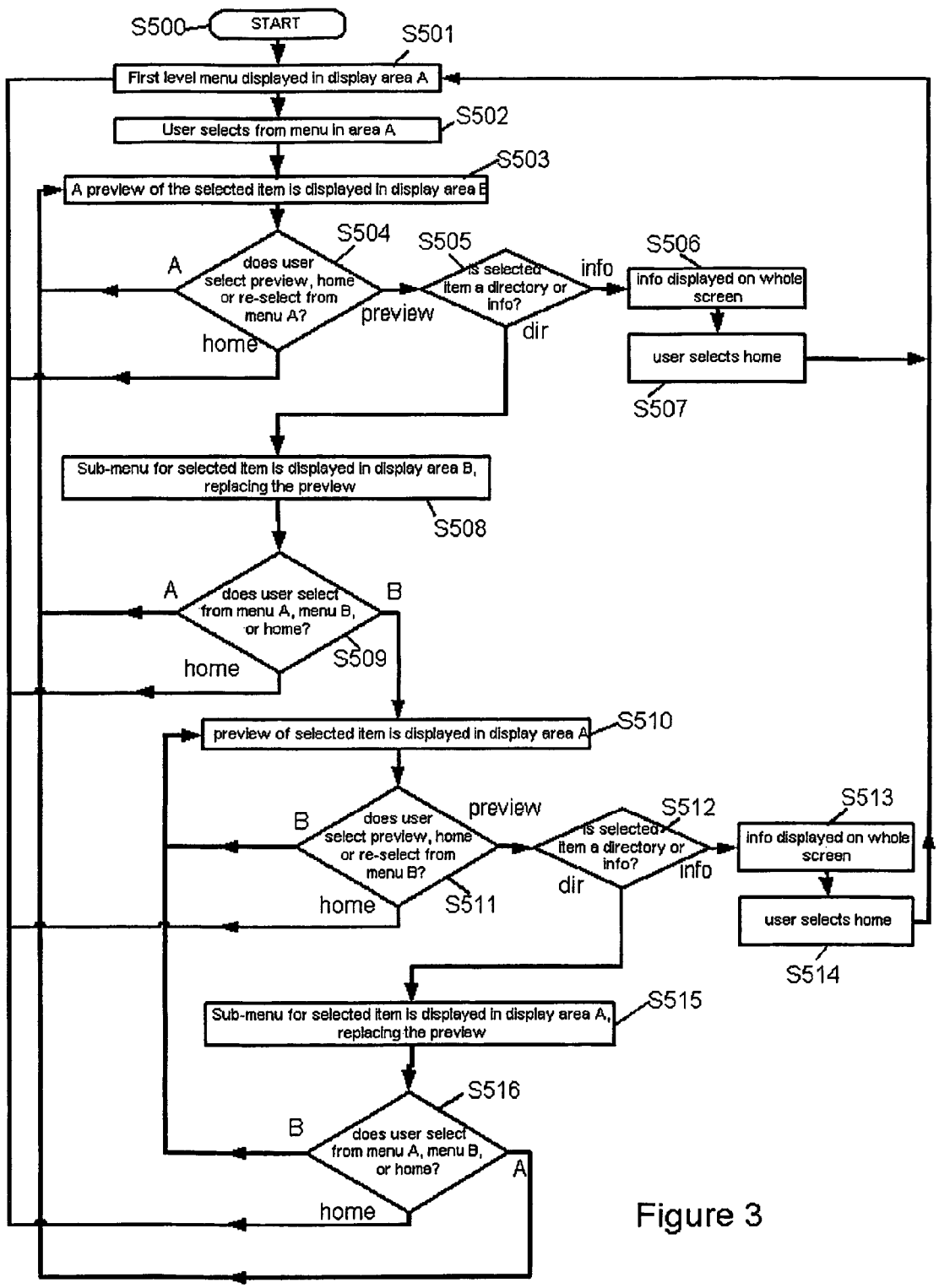
FIG. 3 is a flowchart showing a process for displaying information according to an embodiment of the invention.

FIG. 3 is a flowchart showing a process of navigation through a hierarchical directory structure to obtain and display the information required by the user. This will be described by way of example with reference to the directory structure shown in FIGS. 2A-E, although it is also possible to use the process with an alternative directory structure and/or information structure. Screen layouts and example screenshots corresponding to various steps of the flowchart are shown in FIGS. 4-8 and 10-18.

In the flowchart of FIG. 3, the process begins at step S500. At step S501, the display controller displays a first level menu corresponding to the contents of the top level directory 1000 in the directory structure. It should be noted that in an alternative embodiment, the apparatus may be configured to display a directory other than the top level directory as the first menu.

Figure 4:
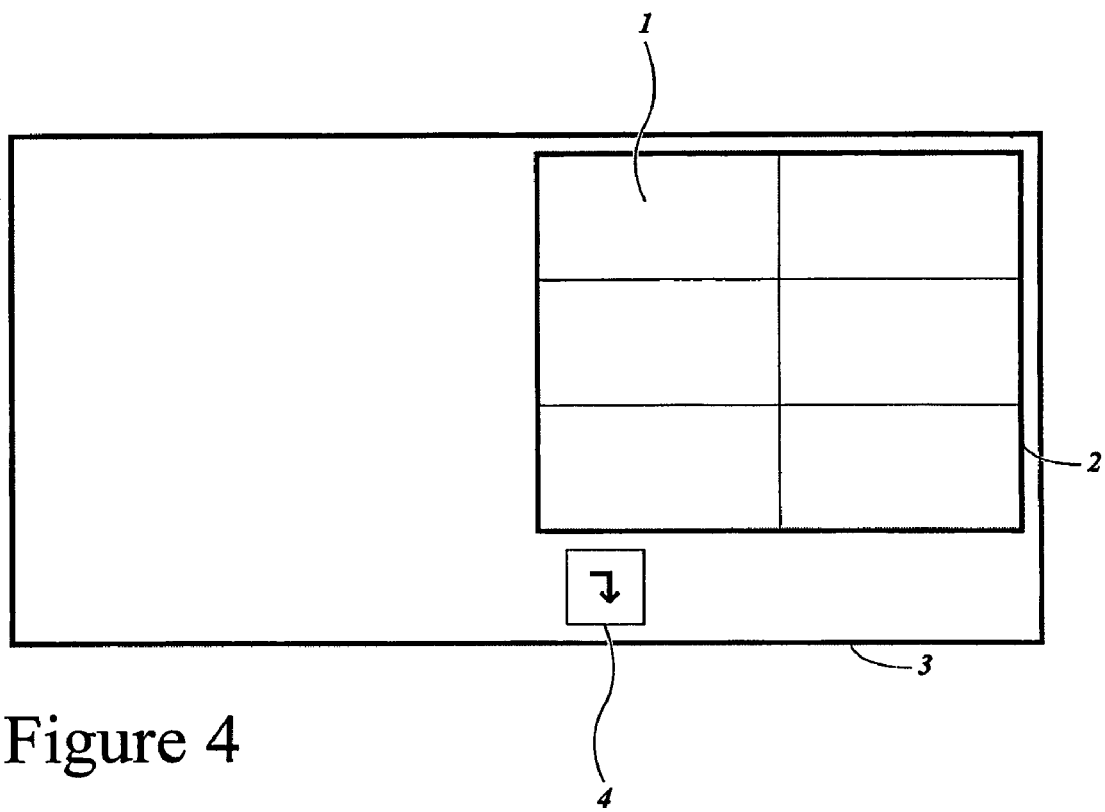
FIG. 4 is a screen layout showing the layout of a menu screen on a computer display used in an embodiment of the invention.
Figure 10:
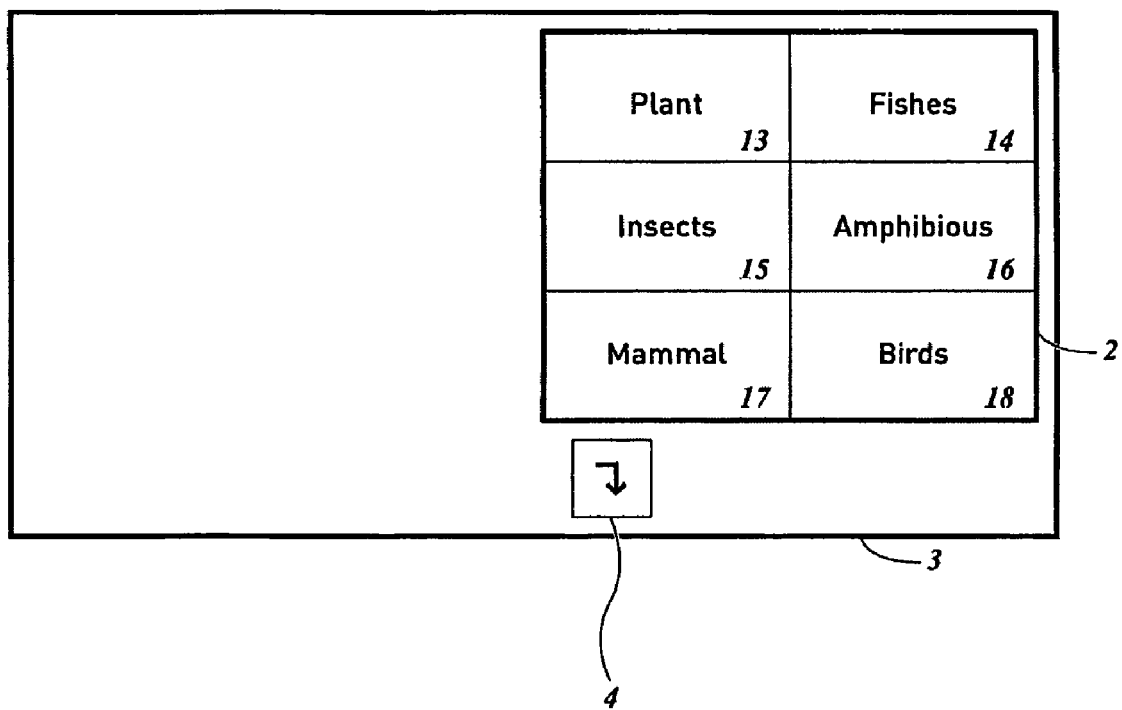
FIG. 10 shows an enlarged computer screenshot for the top level menu, in the embodiment of FIGS. 9A to C.

At step S501, this first level menu is displayed in a first display area, referred to as display area A. A screen layout for this arrangement is shown in FIG. 4. With the example directory structure, the menu items shown at this stage are "Plant" 1001, "Fishes" 1032, "Insects" 1063, "Amphibious" 1094, "Mammal" 1125 and "Birds" 1253. An example screenshot is shown in FIG. 10.

Figure 5:
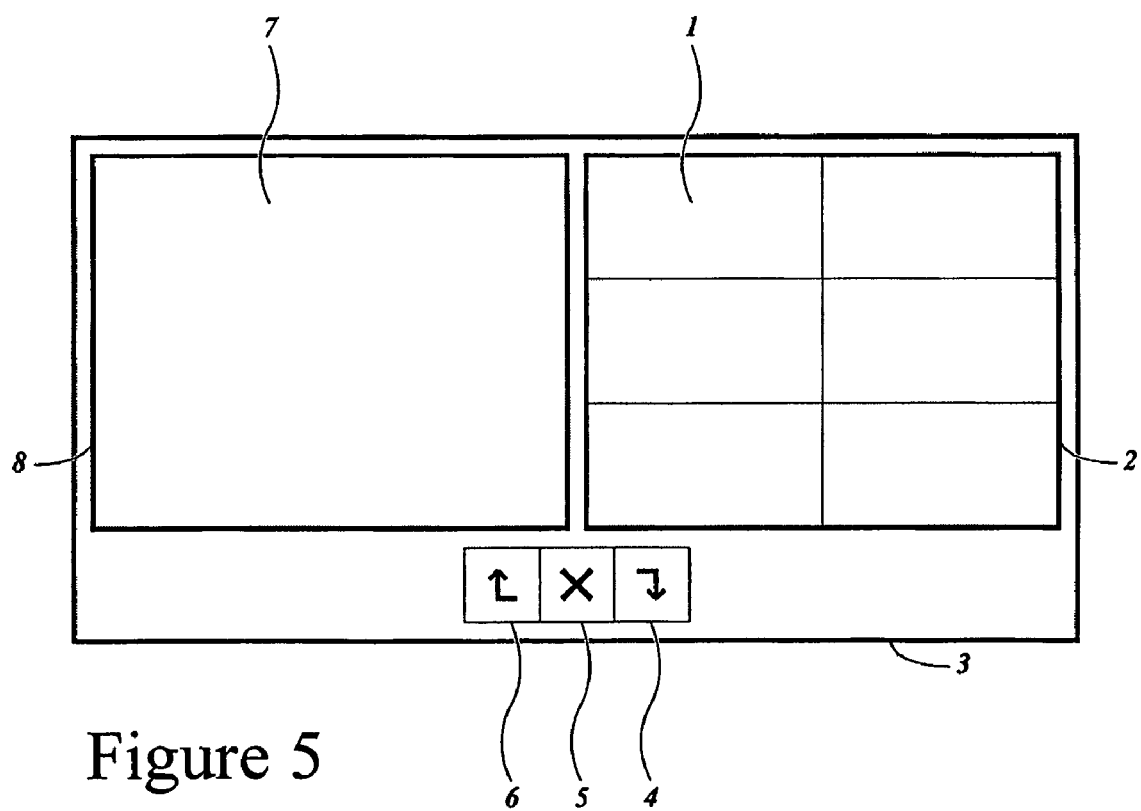
FIG. 5 is a further screen layout showing the layout of a menu screen and preview screen on a computer display used in an embodiment of the invention.
Figure 11:
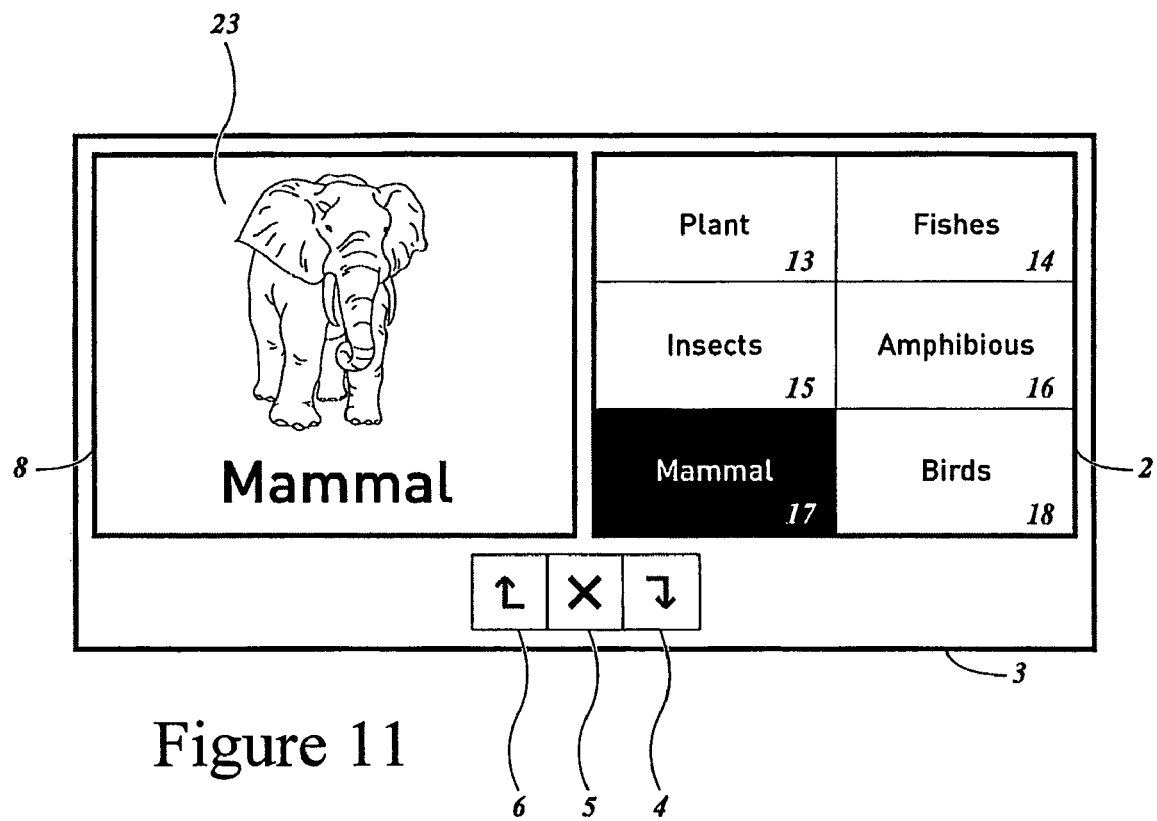
FIG. 11 shows an enlarged computer screenshot for the top level menu with second level preview, in the embodiment of FIGS. 9A to C.

At step S502, the user selects a menu item from display area A. At step S503, a preview of that menu item is displayed in display area B. If the user selects, for example, the "Mammal" menu item, a preview image of a mammal is displayed in area B. A menu item is selected by the user, using the user input device 602. The user may thus press keys on a key pad, move a pointer, click a button, etc to provide a selection. In the case of a key pad, the keys may be provided with predetermined choices to correspond to items in the menu, e.g. the keys may be labelled as "A, B, C, D, etc". A screen layout corresponding to step S503 is shown in FIG. 5, and an example screenshots is shown in FIG. 11.

At step S504, the user either selects the preview, or reselects from menu A in display area A, or selects the "home" option. The "home" option takes the user back to step S501, displaying the first level menu, and the screen layout of FIG. 4. The "reselect from menu A" option takes the user back to step S503, where a preview for the newly selected menu item is displayed in display area B.

Figure 8:
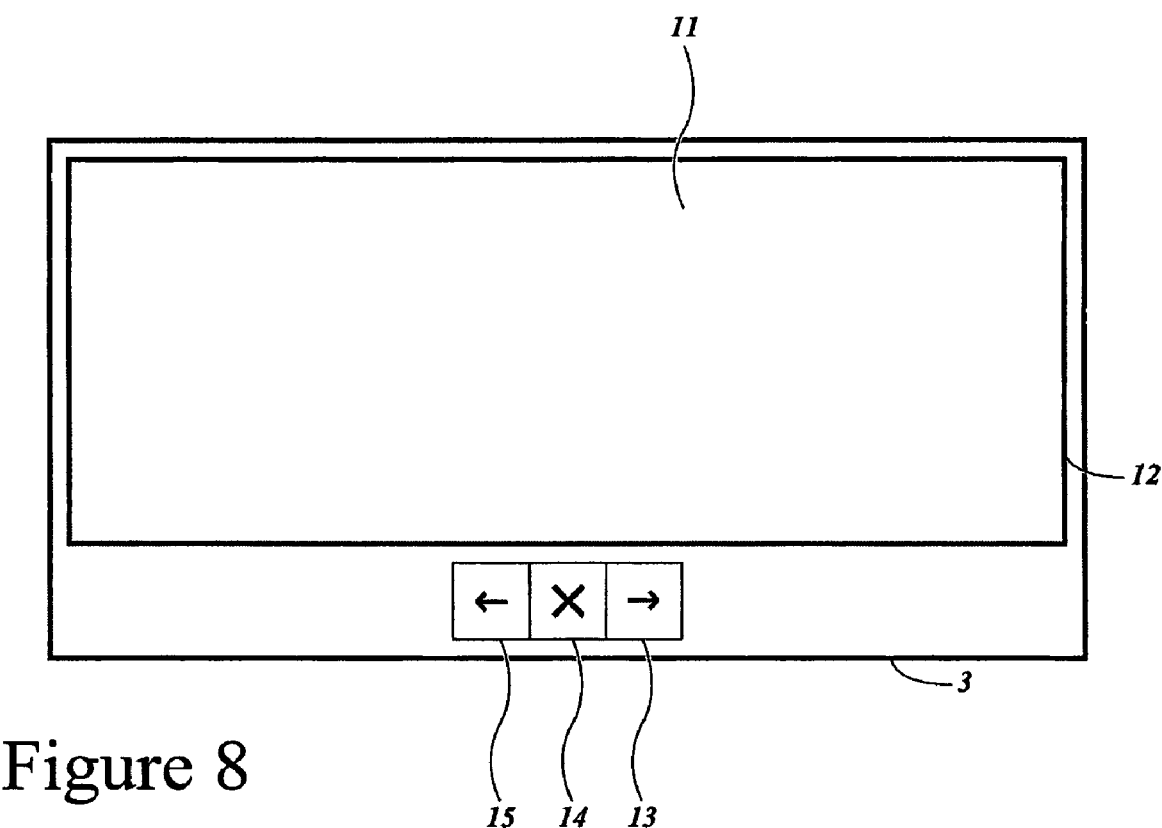
FIG. 8 is a screen layout showing the layout of an information screen on a computer display used in an embodiment of the invention.

If the user selects the preview at step S504, then the process moves on to step S505. If the selected menu item corresponds to information, the information is displayed on the entire screen, spanning both display areas A and B, at step S506. A screen layout corresponding to step S506 is shown in FIG. 8. If the user then selects the "home" option at step S507, the process returns to step S501, and the first level menu is displayed in place of the information in display area A. Display area B may be cleared of the information.

Figure 6:
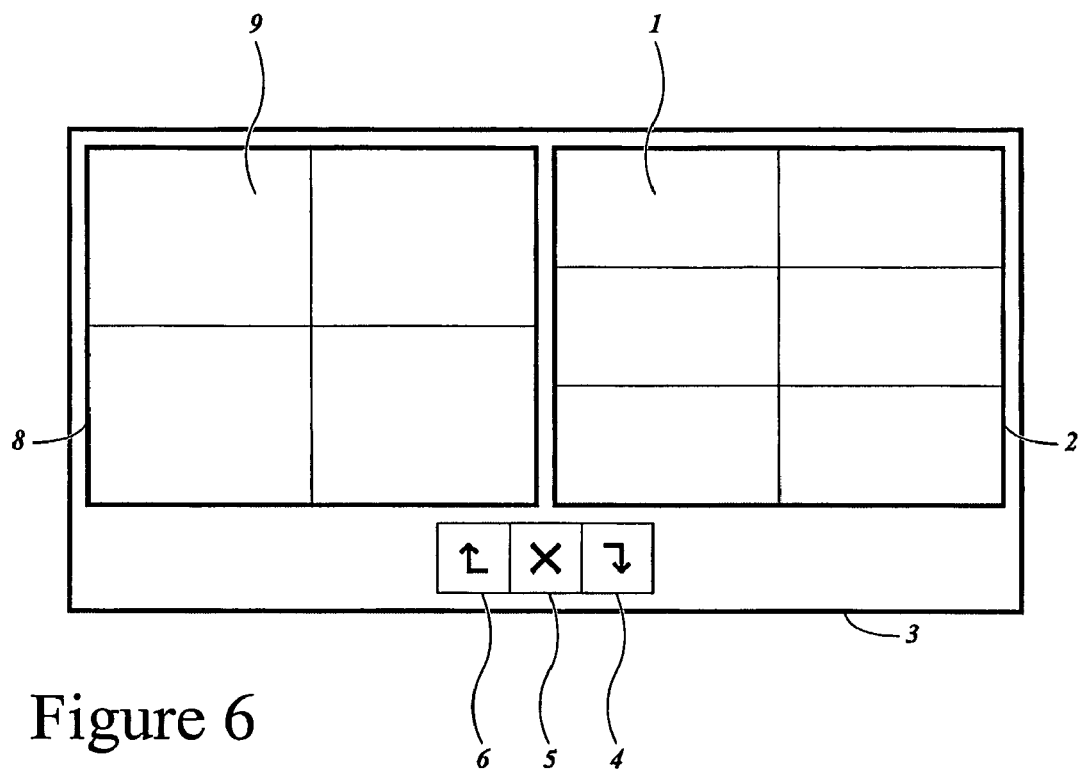
FIG. 6 is a screen layout showing the layout of two menu screens on a computer display used in an embodiment of the invention.
Figure 12:
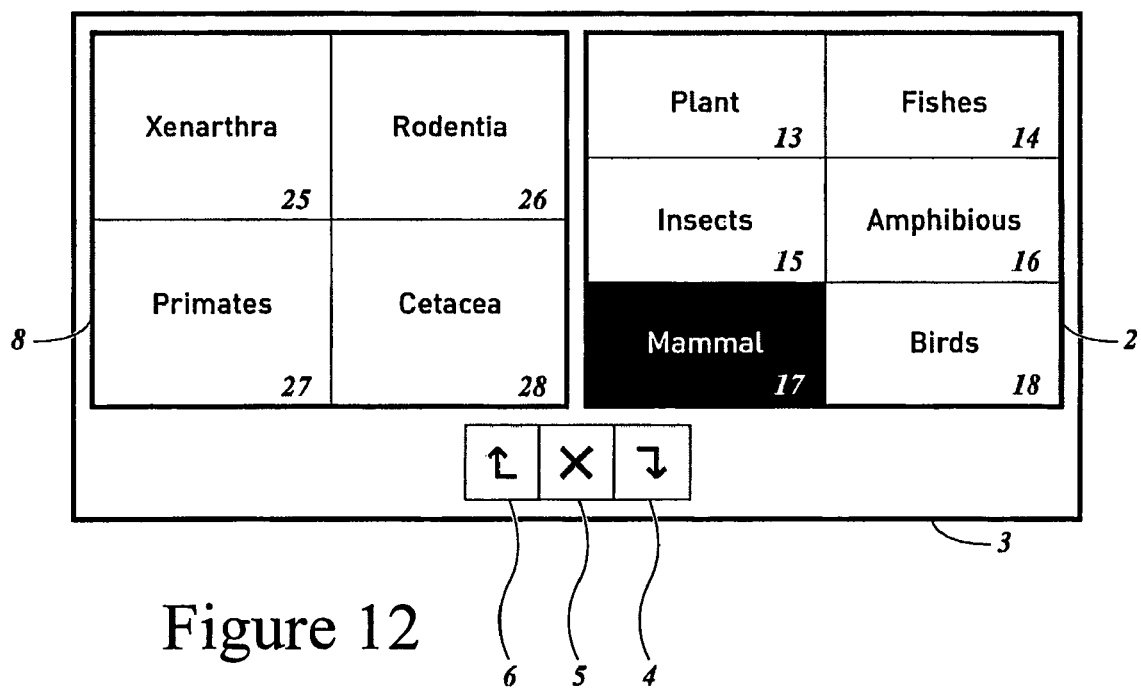
FIG. 12 shows an enlarged computer screenshot for the top and second level menus, in the embodiment of FIGS. 9A to C.

If at step S505, the selected menu item corresponds to a directory, the process moves on to step S508. A sub menu is displayed in display area B, listing the contents of the selected directory, and replacing the preview. Thus in the example, if "mammal" is selected, a sub menu with "Xenarthta", "Rodentia", "Cetacea" and "Primates" is shown in display area B. A screen layout corresponding to step S508 is shown in FIG. 6, and an example screenshot is shown in FIG. 12.

After the sub-menu has been displayed at step S508, the user then selects, at step S509, an item from menu A, or an item from menu B, or the "home" option. Again, if the "home" option is selected, the process goes back to step S501. If an item from menu A is selected, the process goes back to step S503, and a preview of the selected item is shown in display area B.

Figure 7:
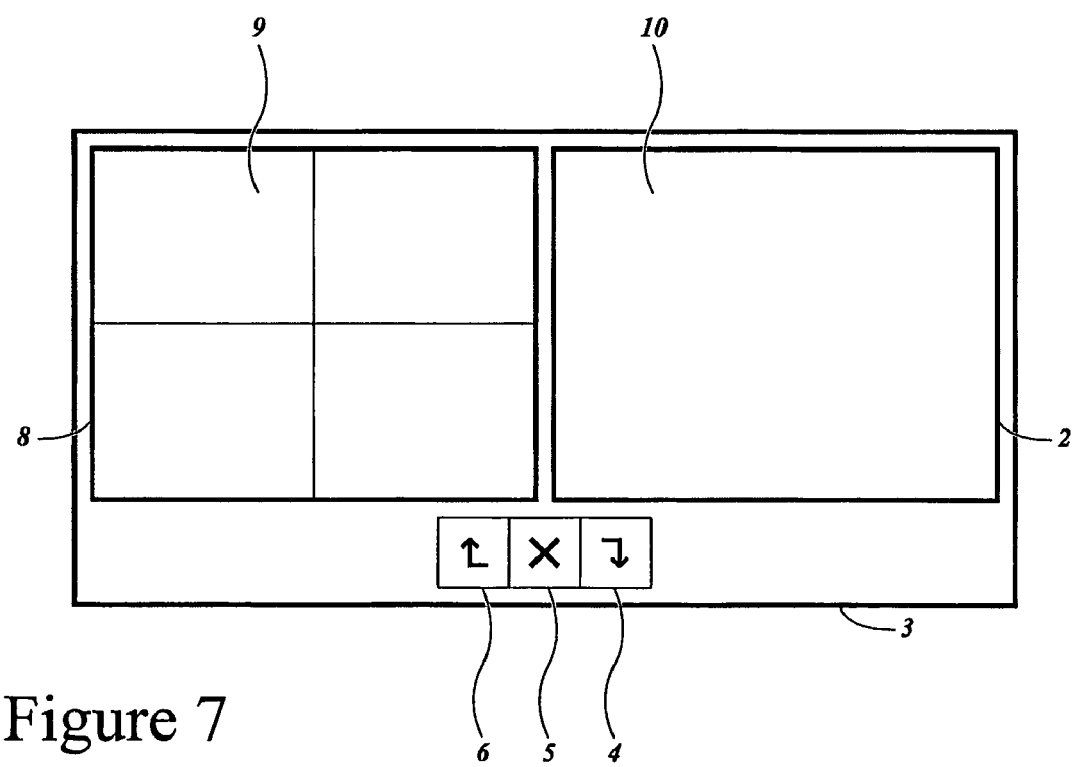
FIG. 7 is a screen layout showing the layout of a menu screen and a preview screen on a computer display used in an embodiment of the invention.
Figure 13:
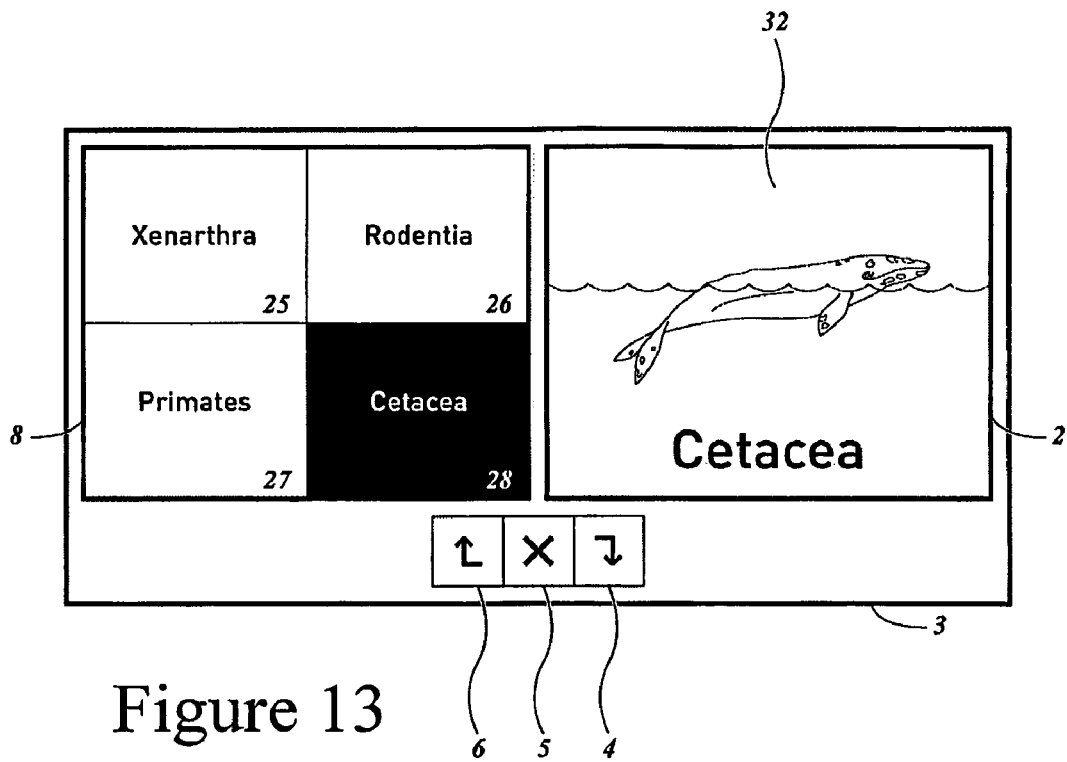
FIG. 13 shows an enlarged computer screenshot for the second level menu with third level preview, in the embodiment of FIGS. 9A to C.

If an item from menu B is selected, the process moves on to step S510, and a preview of the selected item is displayed in display area A. A screen layout corresponding to step S510 is shown in FIG. 7, and an example screenshots is shown in FIG. 13. If the user has selected, for example, the "Cetacea" menu item from menu B at step S509, then a preview image of Cetacea is displayed in area A at step S510.

At step S511, the user either selects the preview, or reselects from menu B in display area B, or selects the "home" option. The "home" option takes the user back to step S501. The "reselect from menu B" option takes the user back to step S510, where a preview for the newly selected menu item is displayed in display area A.

If the user selects the preview at step S511, then the process moves on to step S512. If the selected menu item corresponds to information, the information is displayed on the entire screen, spanning both display areas A and B, at step S513. A screen layout corresponding to step S513 is shown in FIG. 8. If the user then selects the "home" option at step S514, the process returns to step S501, and the first level menu is displayed in place of the information in display area A. Display area B may be cleared of the information.

Figure 14:
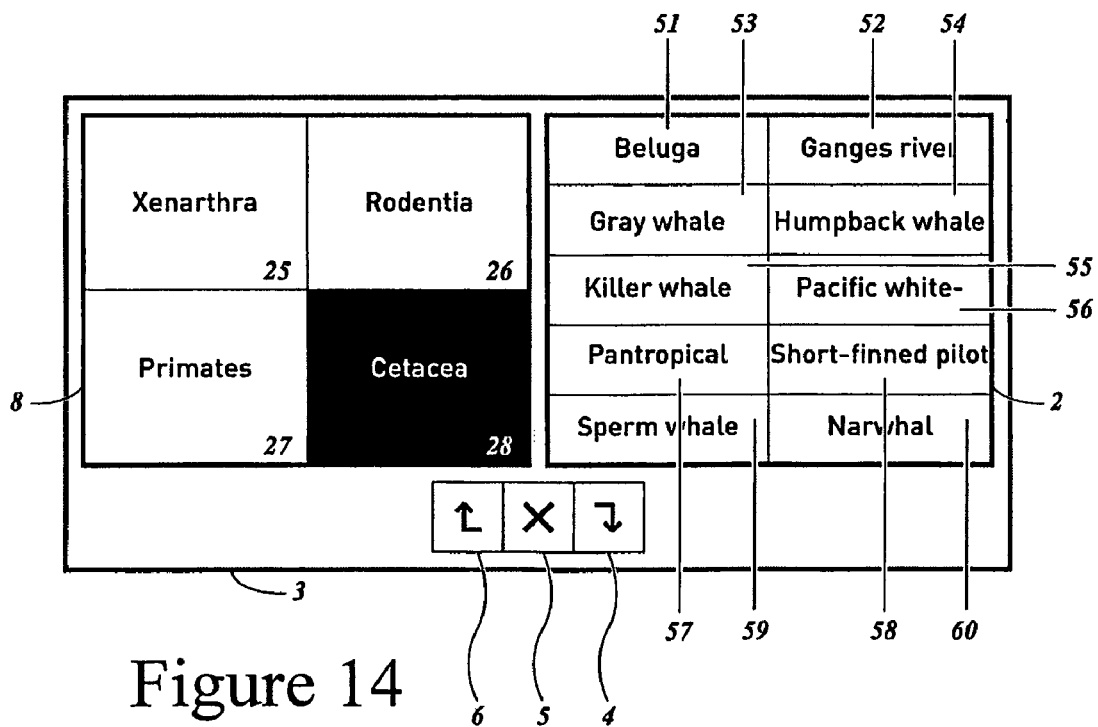
FIG. 14 shows an enlarged computer screenshot for the second and third level menus, in the embodiment of FIGS. 9A to C.

If at step S512, the selected menu item corresponds to a directory, the process moves on to step S515. A sub menu is displayed in display area B, listing the contents of the selected directory, and replacing the preview. An example screenshot is shown in FIG. 14. Thus in the example, if "Cetacea" is selected, a sub menu with "Beluga", "Gray Whale", "Killer Whale", "Pantropical", "Sperm Whale", "Ganges river", "Humpback Whale", "Pacific White", "Short finned pilot" and "Narwhal" is shown in display area A.

After the sub-menu has been displayed at step S515, the user then selects, at step S516, an item from menu A, or an item from menu B, or the "home" option. Again, if the "home" option is selected, the process goes back to step S501. If an item from menu A is selected, the process goes back to step S503, and a preview of the selected item is shown in display area B. If an item from menu B is selected, the process goes back to step S510, and a preview of the selected item is shown in display area A.

When information is displayed on the screen in steps S506 or S513, the only option shown in the flowchart is to select the "home" option to return to the first level menu, thereby allowing another selection to be made from the menus. However, it is also possible to provide a "back" option to allow a user to move back to a previously displayed menu and/or preview, instead of moving all the way back to the first level menu. For example, at step S507, a "back" option may be provided to take the user back to the preview display of step S504. Similarly, at step S514, a "back" option may be provided to take the user back to the preview display of step S510.

FIG. 4 shows a screen layout for a computer screen in a first embodiment of the invention. This screen layout may be used at step S501 of FIG. 3. The screen has a first display area 2 on the right hand side of the screen, which corresponds to area A in the flowchart of FIG. 3. The first display area 2 is divided into six boxes 1, where each box is for accommodating a single menu item. Alternatively, the display area may be divided into a different number of boxes to accommodate a different number of menu items. The bottom part of the display shows a "forward" control button 4, to allow a user to move back and forward through the directory structure according to their history list. This may be used if a user has navigated back from another part of the directory structure to the first level menu.

FIG. 5 shows a screen layout for a menu plus preview 7 in the first embodiment of the invention. This screen layout may be used at step S503 of FIG. 3. The menu part of the layout is identical to that shown in FIG. 4. The preview part of the layout is in the second display area 8, which is on the left hand side of the screen, and corresponds to area B in the flowchart of FIG. 3. The bottom part of the screen now shows three control buttons 4, 5, 6. The left hand side button 6 shows an up-pointing arrow, and corresponds to a "back" button. The middle button 5 shows an "X" and corresponds to a "home" button. The right hand side button 4 shows a down-pointing arrow, and corresponds to a "forward" button. Selecting the home button 5 takes a user back to the top of the directory structure, and displays the screen layout shown in FIG. 4.

FIG. 6 shows a screen layout for the menu of FIGS. 4 and 5, plus an additional sub menu. This screen layout may be used at step S508 of FIG. 3. The sub menu is displayed in the second display area 8 on the left hand side of the screen. In this example, the sub menu is divided into four boxes 9 to accommodate four menu items, although in further embodiments, a different number of boxes may be used to accommodate a different number of menu items.

FIG. 7 shows a screen layout in which the sub menu of FIG. 6 in the second display area 8, and a preview from the sub menu is displayed in the first display area 2. This screen layout may be used at step S510 of FIG. 3.

FIG. 8 shows a screen layout in which information is displayed in both the first and second display areas. The first and second display areas are no longer separate, but are now merged to form a single display area 12. This screen layout may be used at step S506 and/or step S513 of FIG. 3.

Figure 9A:
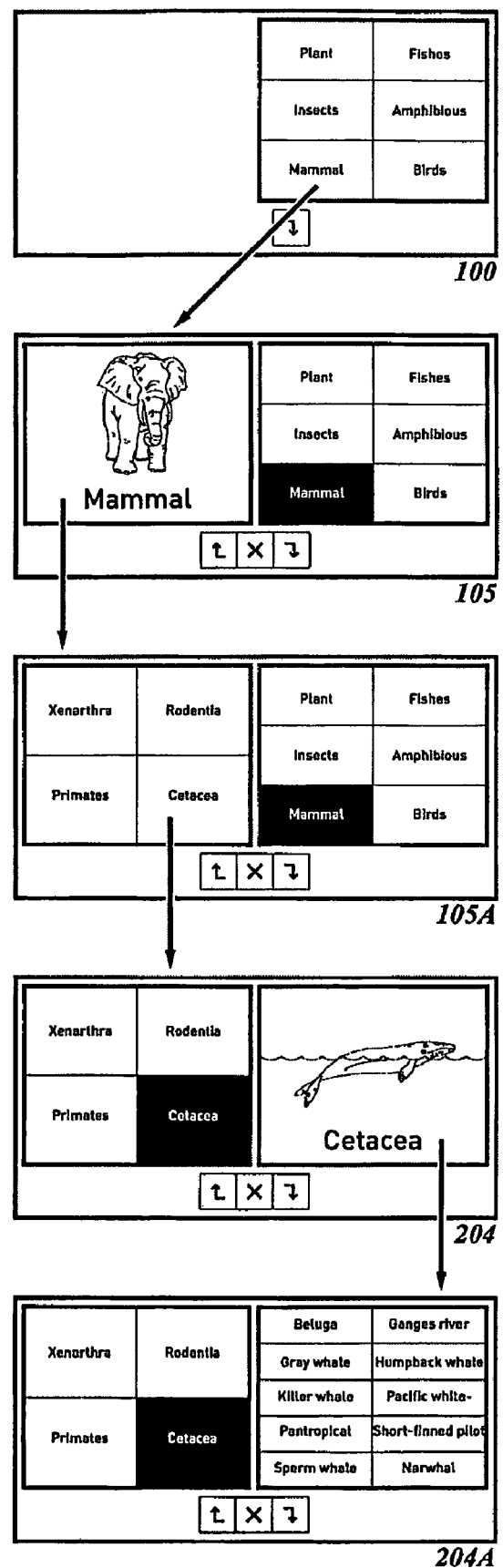
FIGS. 9A and 9B show a plurality of screenshots corresponding to the screen layouts of FIGS. 4 to 8, when used with an example information source and directory structure.
Figure 9B:
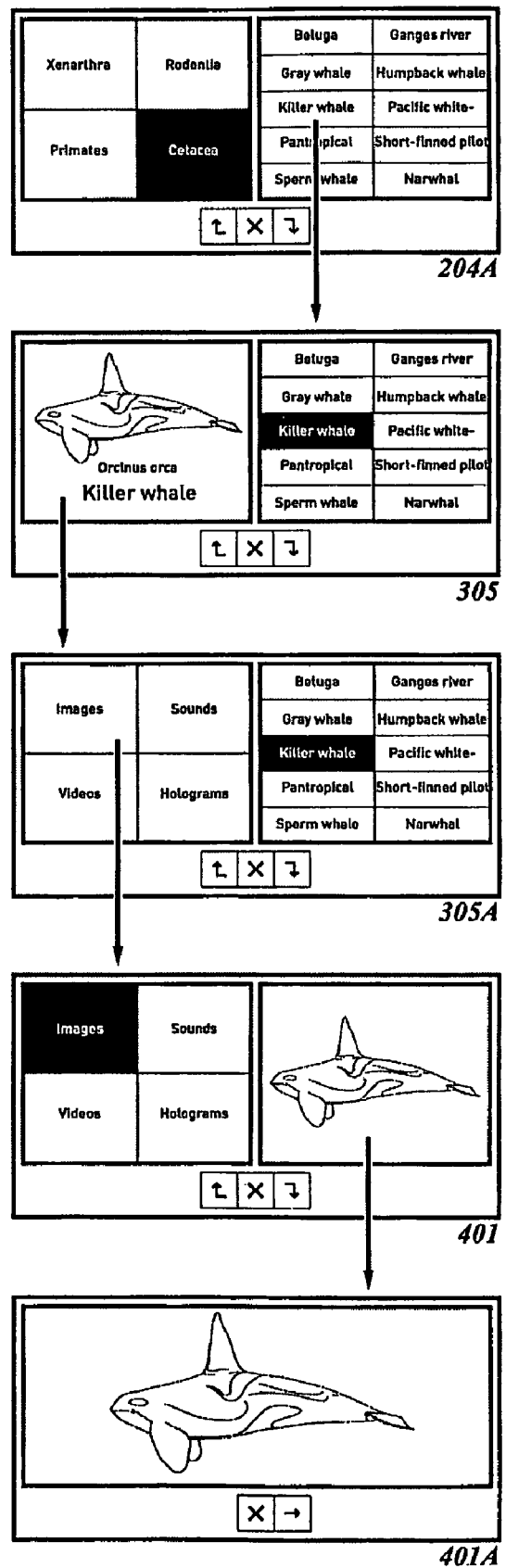
Figure 9C:
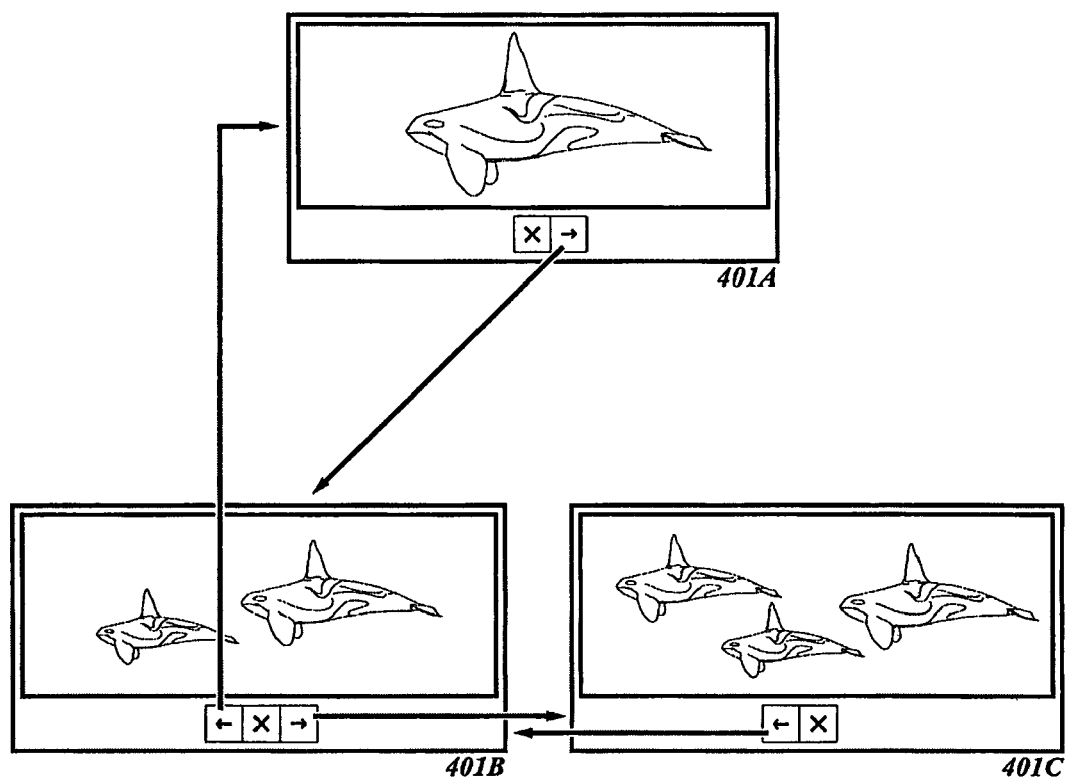
FIG. 9C illustrates the multiple picture display feature which is provided in one embodiment of the invention.

FIGS. 9A, 9B and 9C show screenshots using the screen layouts of FIGS. 4 to 8 using an example directory structure and information source, containing information about ecology, as shown in FIG. 2A-G. It is also possible to use these screen layouts with alternative directory and information structures. Arrows are shown in FIGS. 9A to C, to illustrate how a user may navigate from one screenshot to another to navigate through the directory structure.

FIGS. 10 to 20 are enlarged views of the screenshots shown in FIGS. 9A-C. The method of navigating through the directory structure will now be described with reference to FIGS. 9A-C, and to these enlarged views of the screenshots.

The screenshot 100 on the top left hand side of FIG. 9A is the default starting screen display. It is also shown in FIG. 10. The display is divided into two display areas, with one display area on the left hand side of the display, and the other on the right hand side of the display. The left hand display area is initially blank, and the right hand display area contains the top level menu 2. The top level menu 2 contains six menu items, for "Plant" 13, "Fishes" 14, "Insects" 15, "Amphibious" 16, "Mammal" 17 and "Birds" 18. This screenshot corresponds to step S501 of FIG. 3.

In FIG. 11, the right hand side of the screen is identical to that in FIG. 10, apart from the fact that a user selection of the menu item "mammal" 17 has been made, so "mammal" 17 is now highlighted. The left hand side display area 8 now shows a preview corresponding to the user selection "mammal" 17. In this case, the preview shows a picture of an elephant, which is an example of a mammal. This screenshot corresponds to step S503 in the flowchart of FIG. 3.

If a user clicks the pointer on the preview, or on the highlighted "mammal" menu item, the screenshot of FIG. 12 is then displayed. This screenshot corresponds to step S508 in the flowchart of FIG. 3. The right hand side display area 2 of FIG. 12 is identical to that of FIG. 11. However, the preview is now replaced by a menu containing the "mammal" second level menu items. These are "Xenarthra" 25, "Rodentia" 26, "Primates" 27 and "Cetacea" 28. The left hand side display area 8 is divided into four quarter, each quarter containing one of these four menu items.

If a user clicks the pointer on the "Cetacea" 28 menu item, the top level menu on the right hand side display area 2 is replaced by a preview image relating to Cetacea. This is shown in FIG. 13, and corresponds to step S510 in the flowchart of FIG. 3. If the highlighted "cetacea" menu item or the preview is then clicked, the preview is replaced with a menu containing third level menu items relating to Cetacea. These are "Beluga" 51, "Ganges River" 52, "Gray Whale" 53, "Humpback Whale" 54, "Killer Whale" 55, "Pacific White" 56, "Pantropical" 57, "Short-finned pilot" 58, "Sperm Whale" 59 and "Narwhal" 60. This is shown in FIG. 14, and corresponds to step S515 in the flowchart of FIG. 3.

Figure 15:
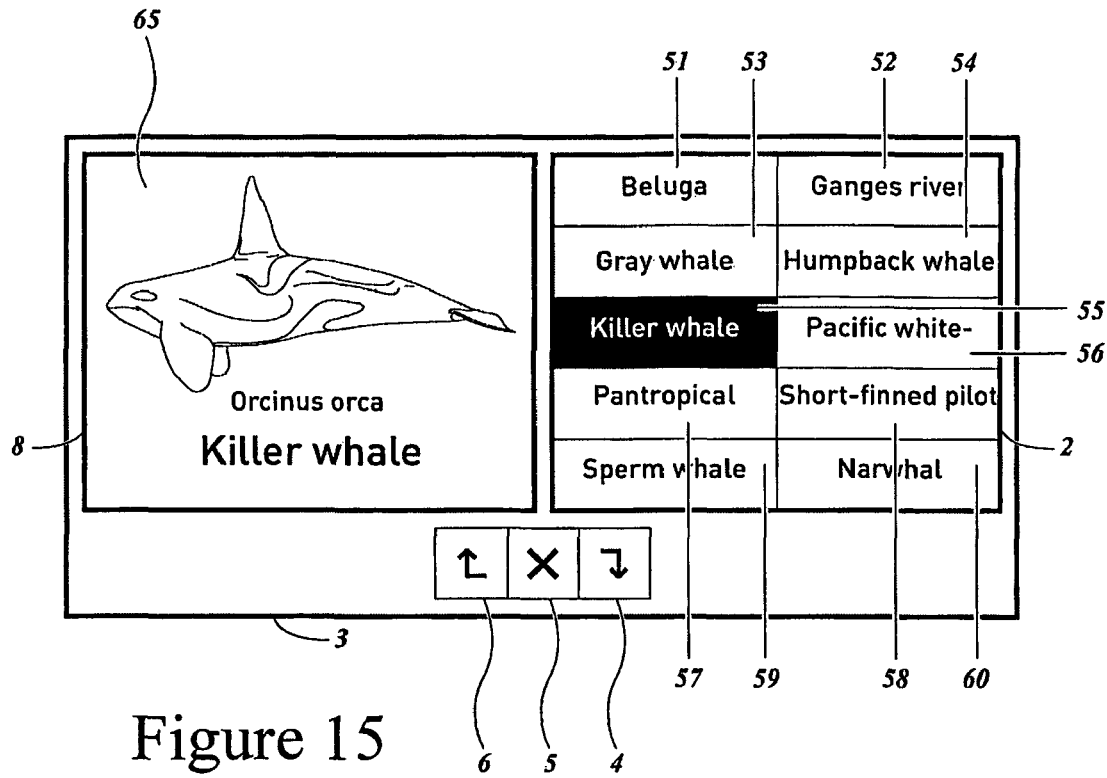
FIG. 15 shows an enlarged computer screenshot for the third level menu with fourth level preview, in the embodiment of FIGS. 9A to C.
Figure 16:
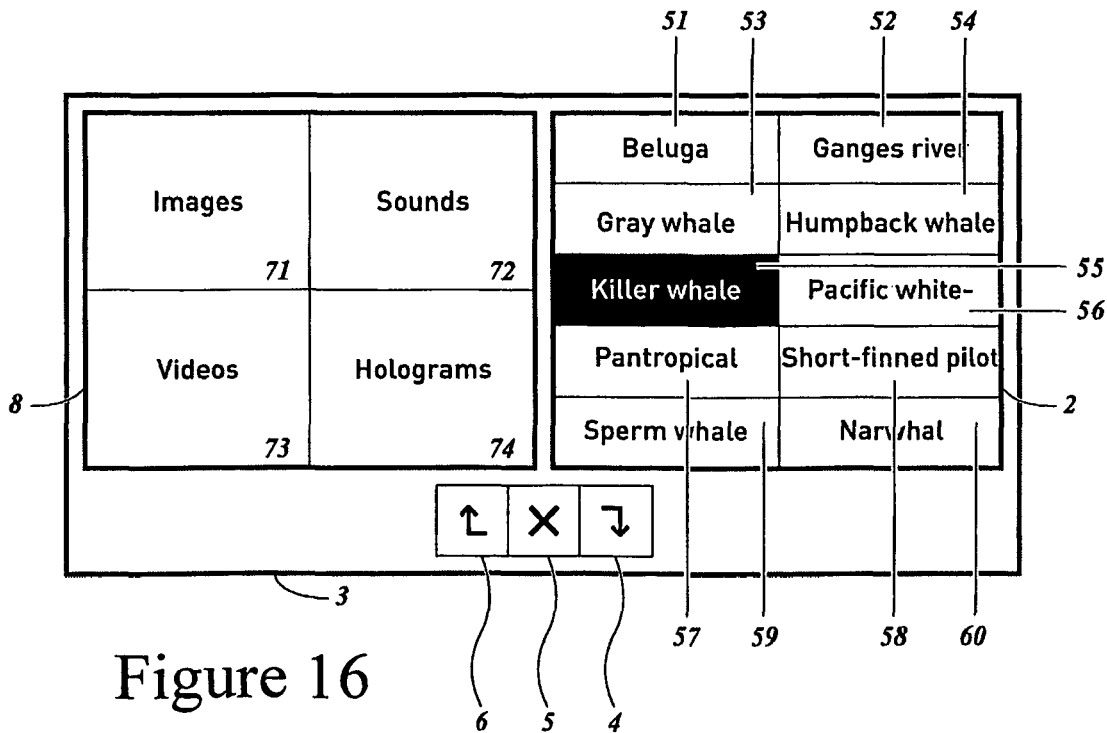
FIG. 16 shows an enlarged computer screenshot for the third and fourth level menus, in the embodiment of FIGS. 9A to C.
Figure 17:
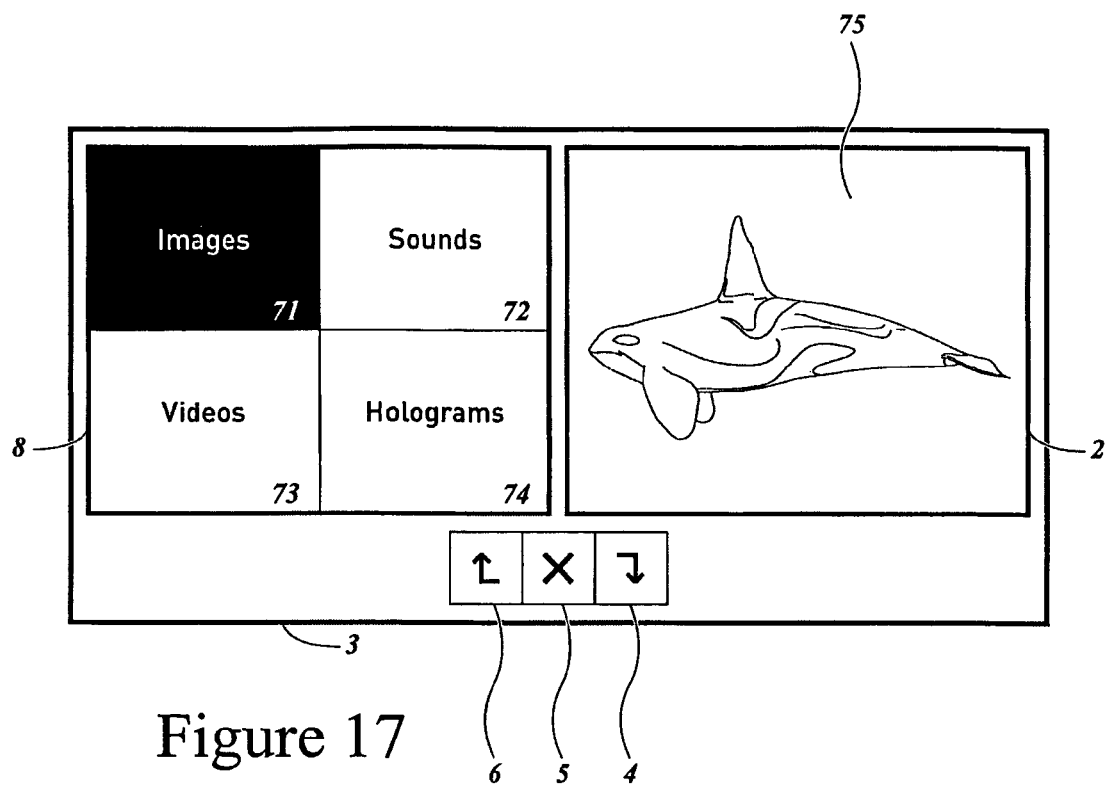
FIG. 17 shows an enlarged computer screenshot for the fourth level menu with fifth level preview, in the embodiment of FIGS. 9A to C.

If a user clicks the pointer on the "Killer Whale" 55 menu item, the menu on the left hand side display area 8 is replaced by a preview image relating to Killer Whale. This is shown in FIG. 15, and corresponds once again to step S503 in the flowchart of FIG. 3. If the highlighted "Killer Whale" menu item or the preview is then clicked by the user, the preview is replaced with a menu containing fourth level menu items relating to Killer Whale. These are "Images" 71, "Sounds" 72, "Videos" 73, and "Holograms" 74. This is shown in FIG. 16 and corresponds to step S508 in the flowchart of FIG. 3. A hologram may be a rotating or rotatable three dimensional image.

Figure 18:
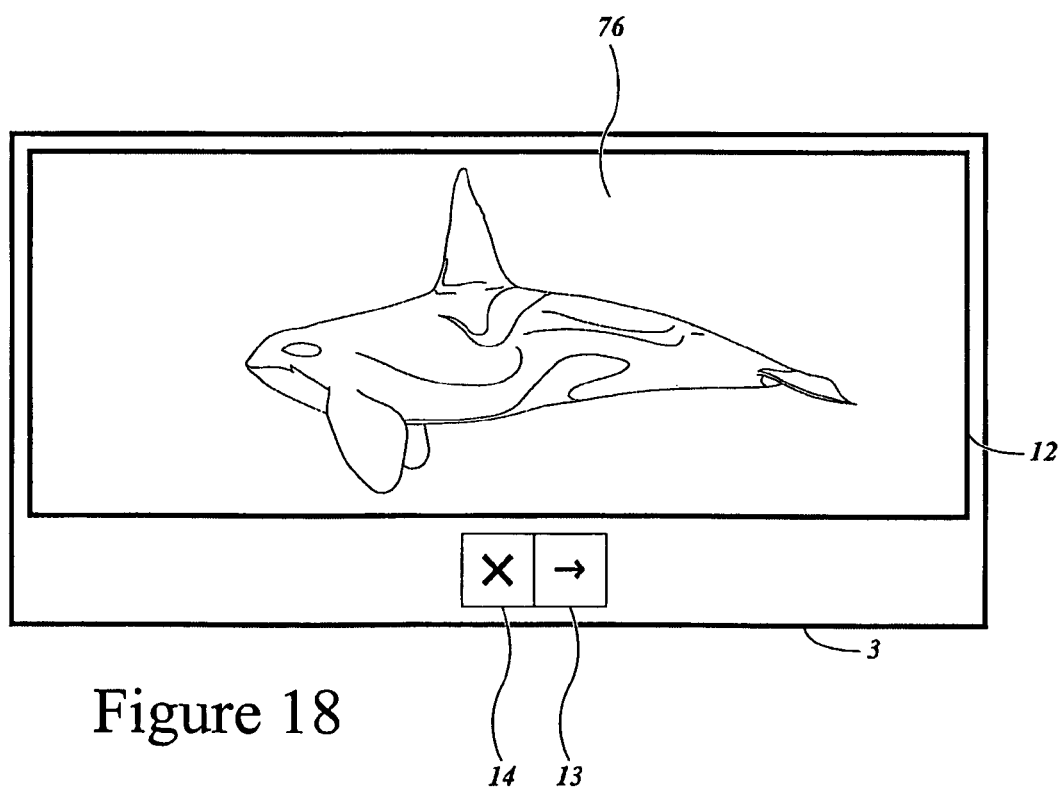
FIG. 18 shows an enlarged computer screenshot for display of information which is indexed by the fifth level menu, in the embodiment of FIGS. 9A to C.

If a user clicks the pointer on the "Images" 71 menu item, a preview of the images is displayed in the right hand side display area 2, as shown in FIG. 16. This screenshot corresponds to step S510 in the flowchart of FIG. 3, following option B in step S509. If the user clicks on the preview or on the highlighted menu item, then the image is displayed. Both the left and right hand side display areas are combined into a single display area in order to display the image, as shown in FIG. 18. This screenshot corresponds to step S513 in the flowchart of FIG. 3.

Figure 19:
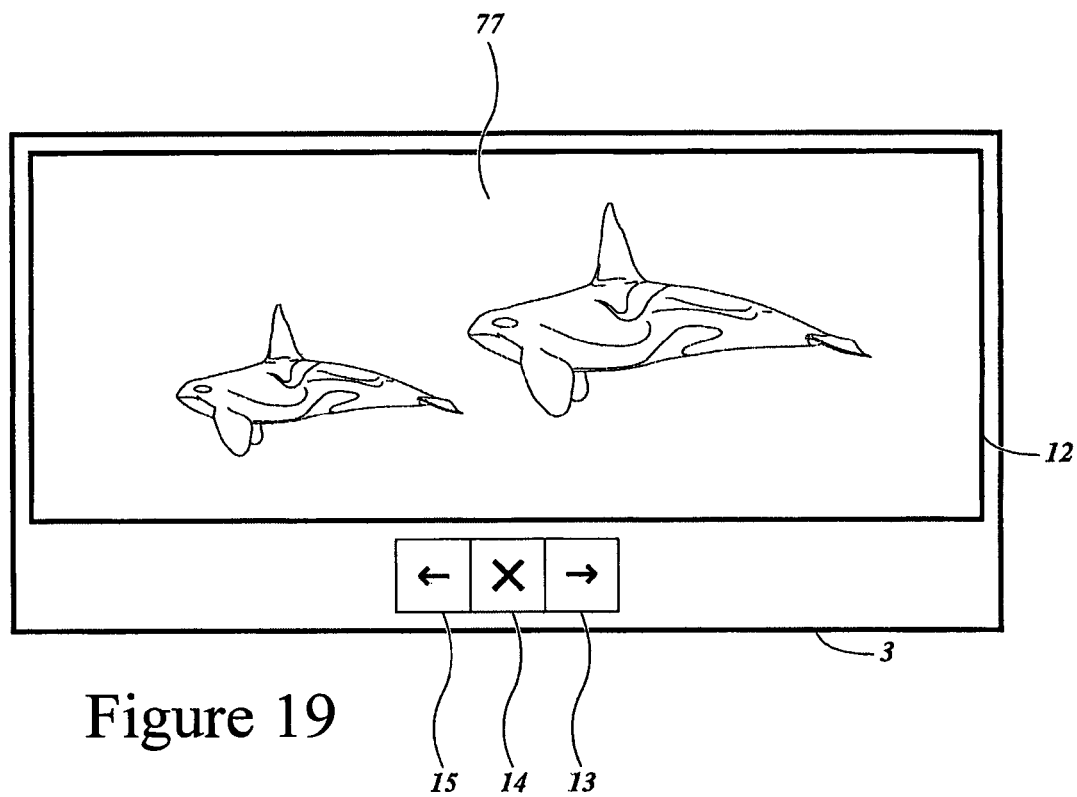
FIG. 19 shows an enlarged computer screenshot illustrating the multiple image display feature, in the embodiment of FIGS. 9A to C.
Figure 20:
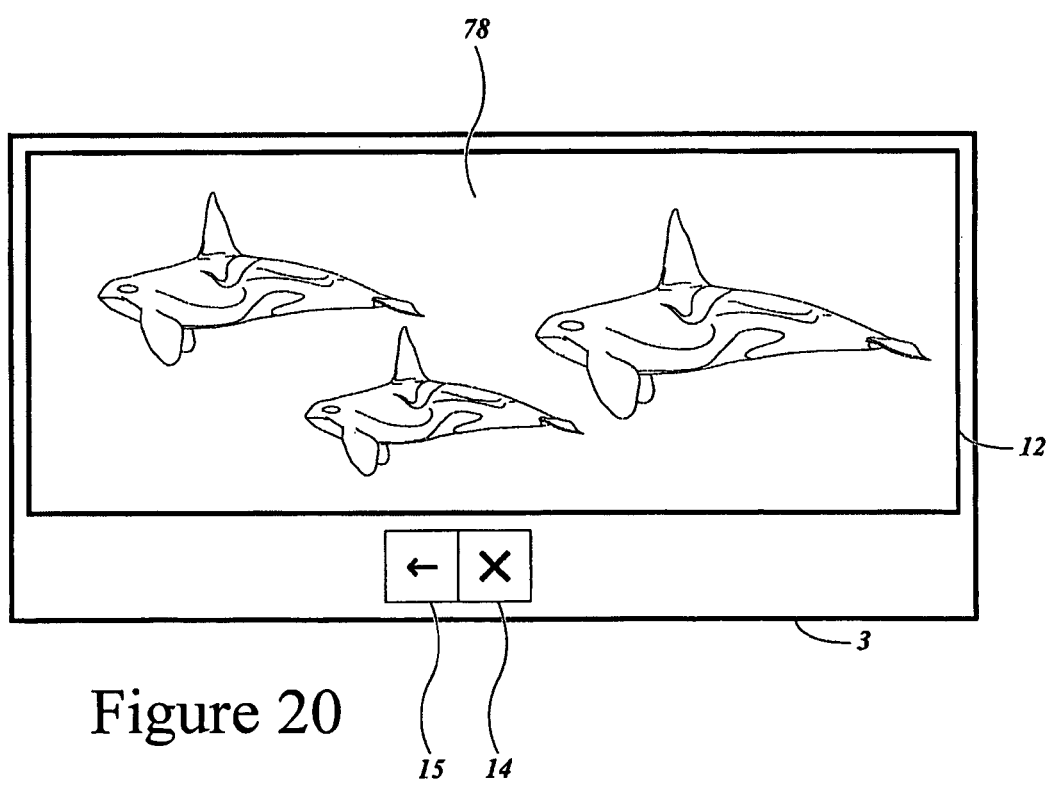
FIG. 20 shows a further enlarged computer screenshot illustrating the multiple image display feature, in the embodiment of FIGS. 9A to C.

FIGS. 19 and 20 are screenshots showing multiple versions of an image displayed on the combined first and second display areas. When in information display mode, i.e. using both display areas together to display information, the use of the "forward" button will increase the number of images displayed, and the use of the "back" button will reduce these. FIG. 19 shows two images of a killer whale, and FIG. 20 shows three images of the killer whale.

FIGS. 21 to 25 illustrate sideways navigation through the directory structure, i.e. when a user selects a first menu item with a directory, then changes their mind and selects a different menu item within the same directory.

Figure 21:
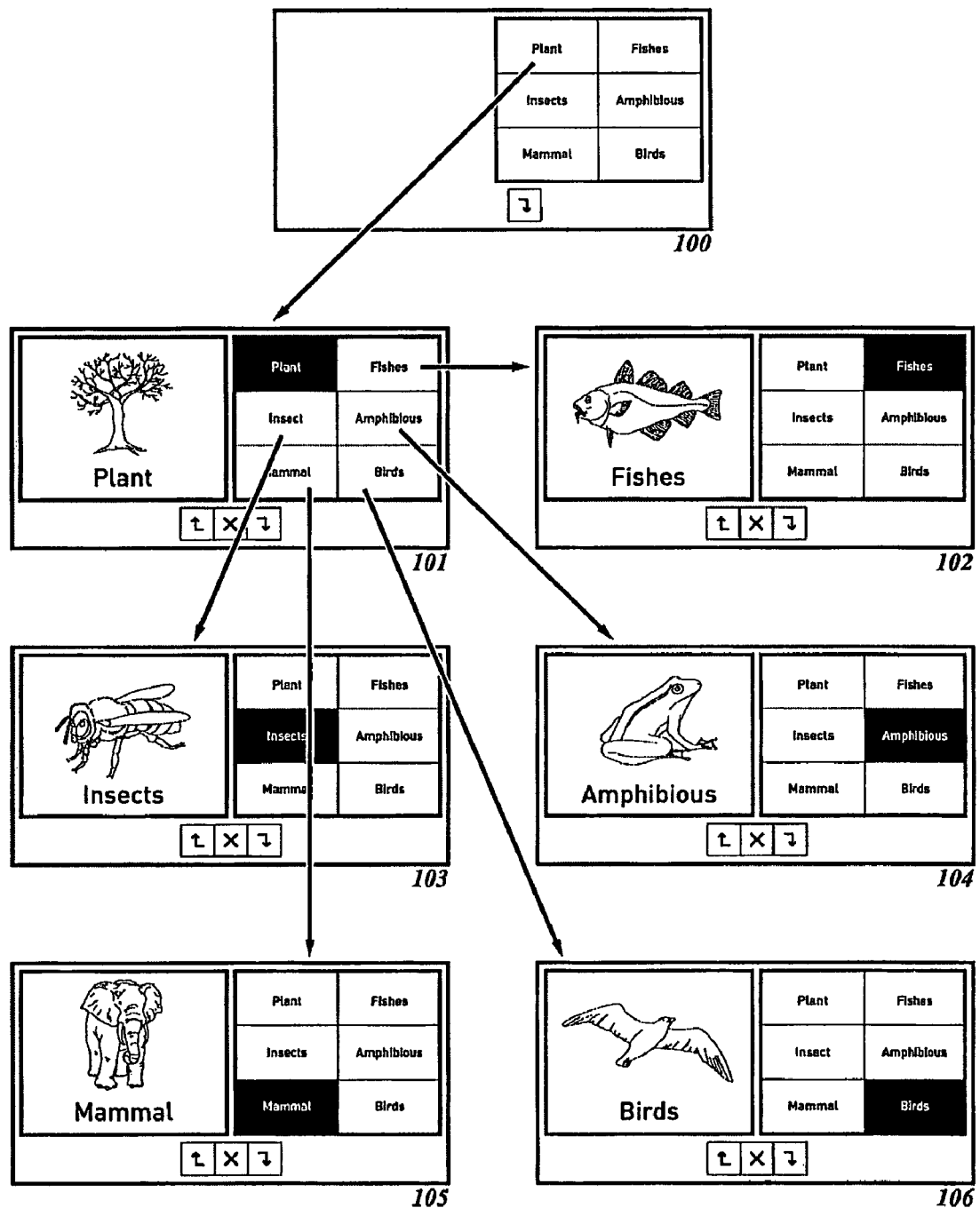
FIG. 21 shows a plurality of screenshots corresponding to the screen layouts of FIGS. 4 and 5, and the way in which these screenshots inter-relate to one another, when the screen layouts are used with an example information source and directory structure.

FIG. 21 shows a series of screenshots relating to the menu items in the top level of the hierarchy and previews for these menu items. Arrows are shown to illustrate how a user may navigate from one screenshot to another. Initially, a user is presented with the screenshot 100 of FIG. 10, which shows the first menu and no preview. If the user selects the "plant" menu item, a preview for "plant" is displayed, as shown in screenshot 101. From this point, a user can display previews for any of the remaining five menu items, by selecting them. The preview display will then change to show a preview corresponding to the most recently selected menu item.

Figure 22:
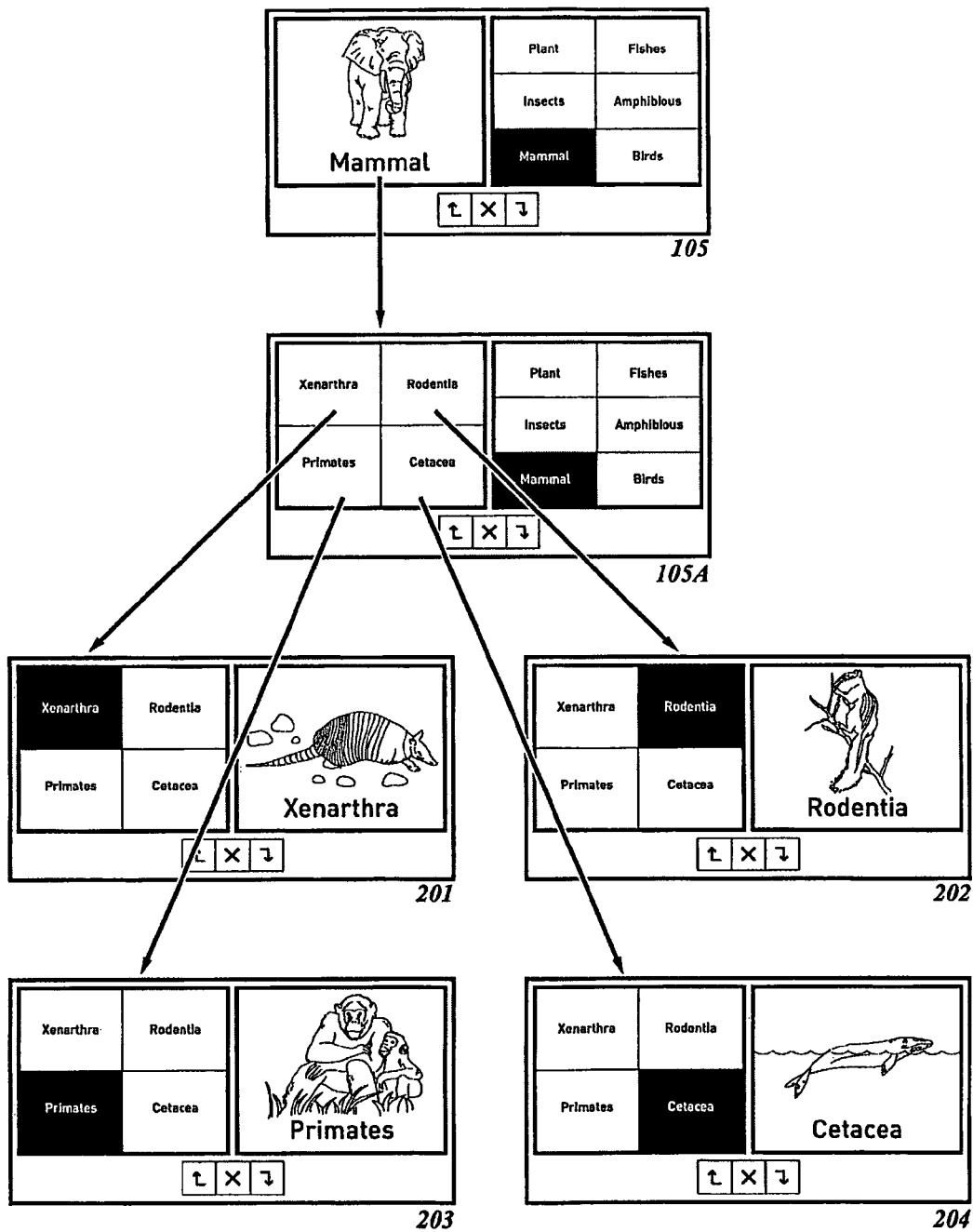
FIG. 22 shows a plurality of screenshots corresponding to the screen layouts of FIGS. 5 to 7, and the way in which these screenshots inter-relate to one another, when the screen layouts are used with an example information source and directory structure.

FIG. 22 shows a series of screenshots relating to user selection of previews from the "mammal" directory. A menu is displayed of the sub directories to the mammal directory when a user selects the mammal preview. A preview for any one of the four subdirectories may then be displayed when a user selects the menu item for that subdirectory.

Figure 23:
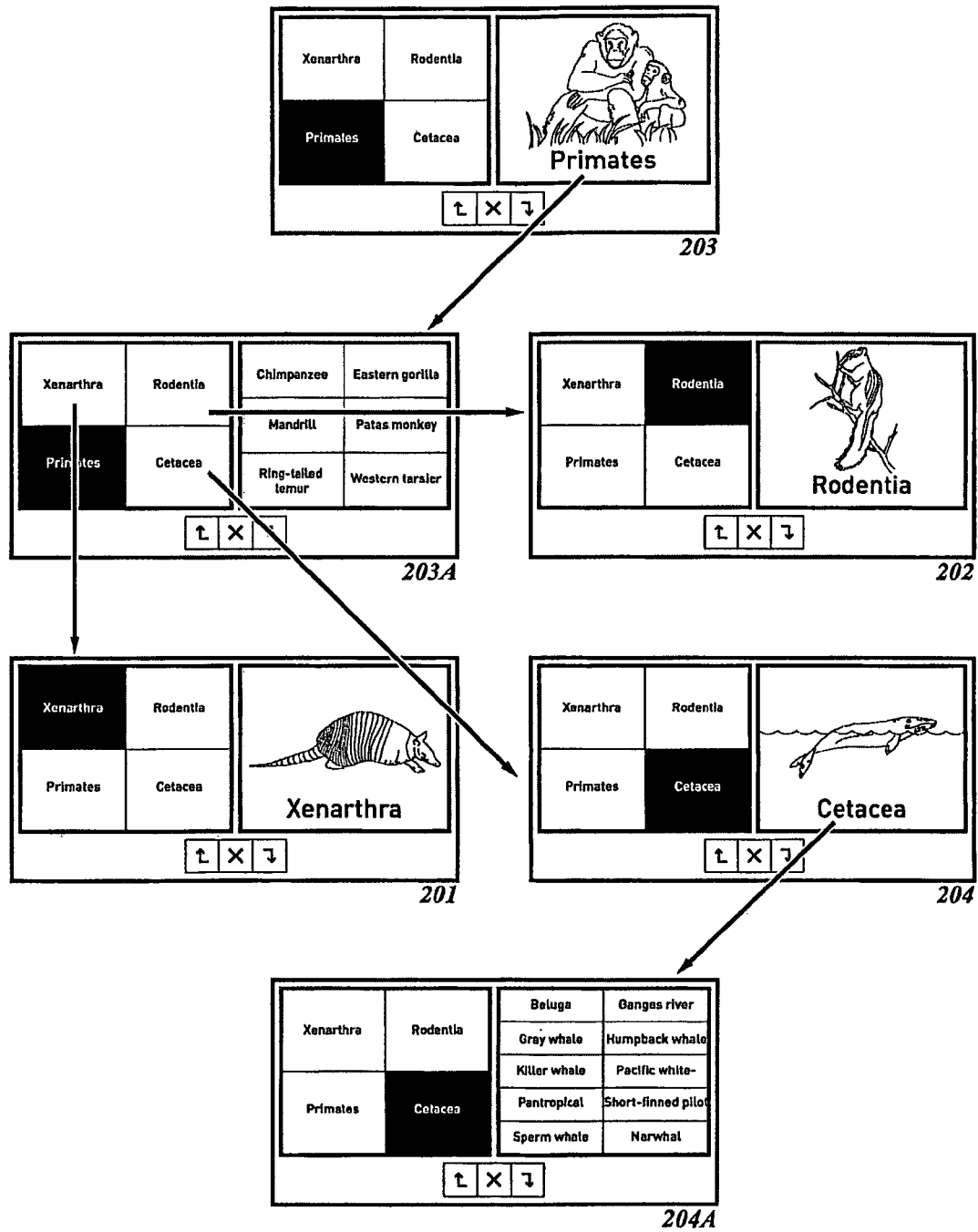
FIG. 23 shows a plurality of screenshots corresponding to the screen layouts of FIGS. 5 to 8, and the way in which these screenshots inter-relate to one another, when the screen layouts are used with an example information source and directory structure.
Figure 24:
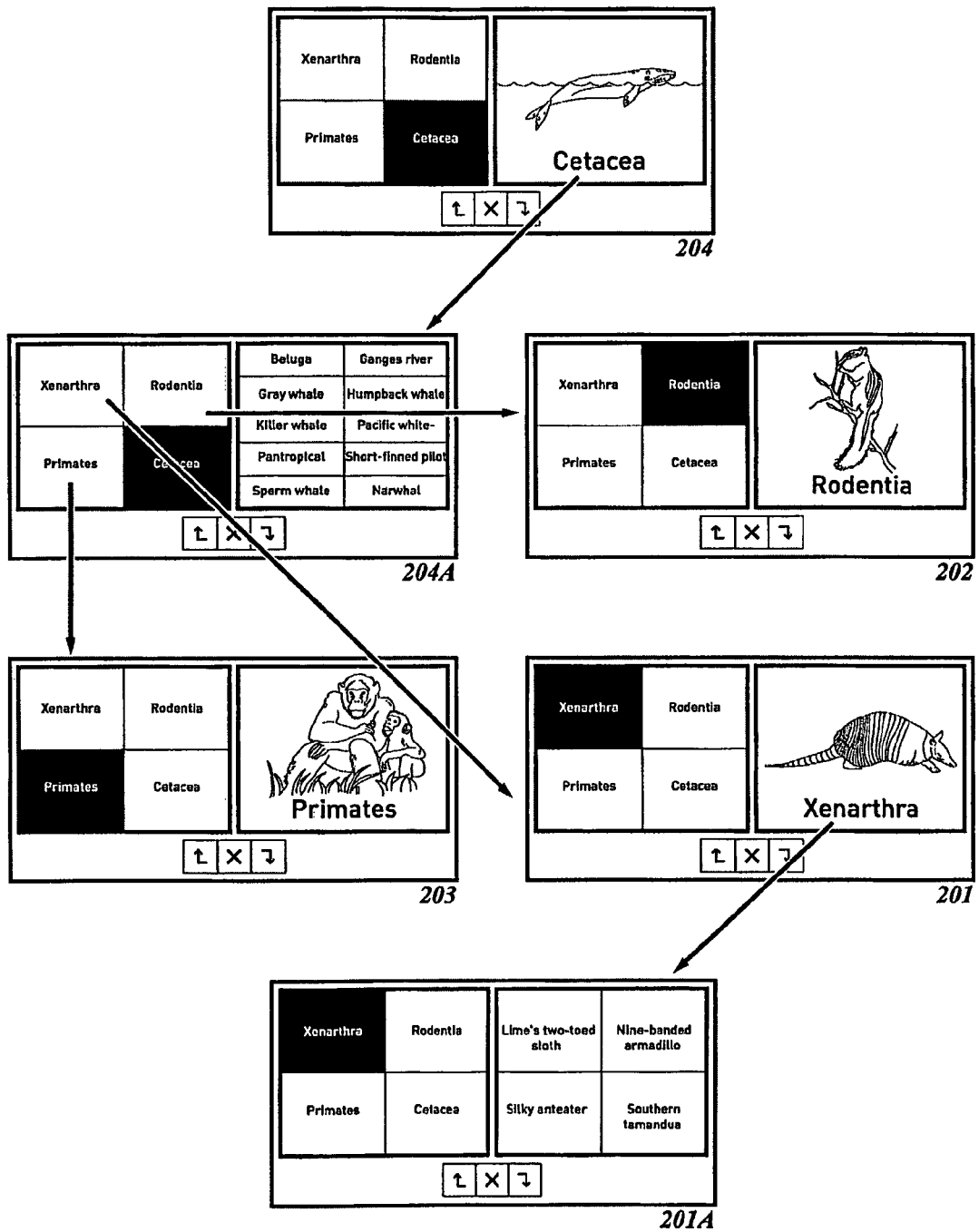
FIG. 24 shows a plurality of screenshots corresponding to the screen layouts of FIGS. 5 to 8, and the way in which these screenshots inter-relate to one another, when the screen layouts are used with an example information source and directory structure.
Figure 25:
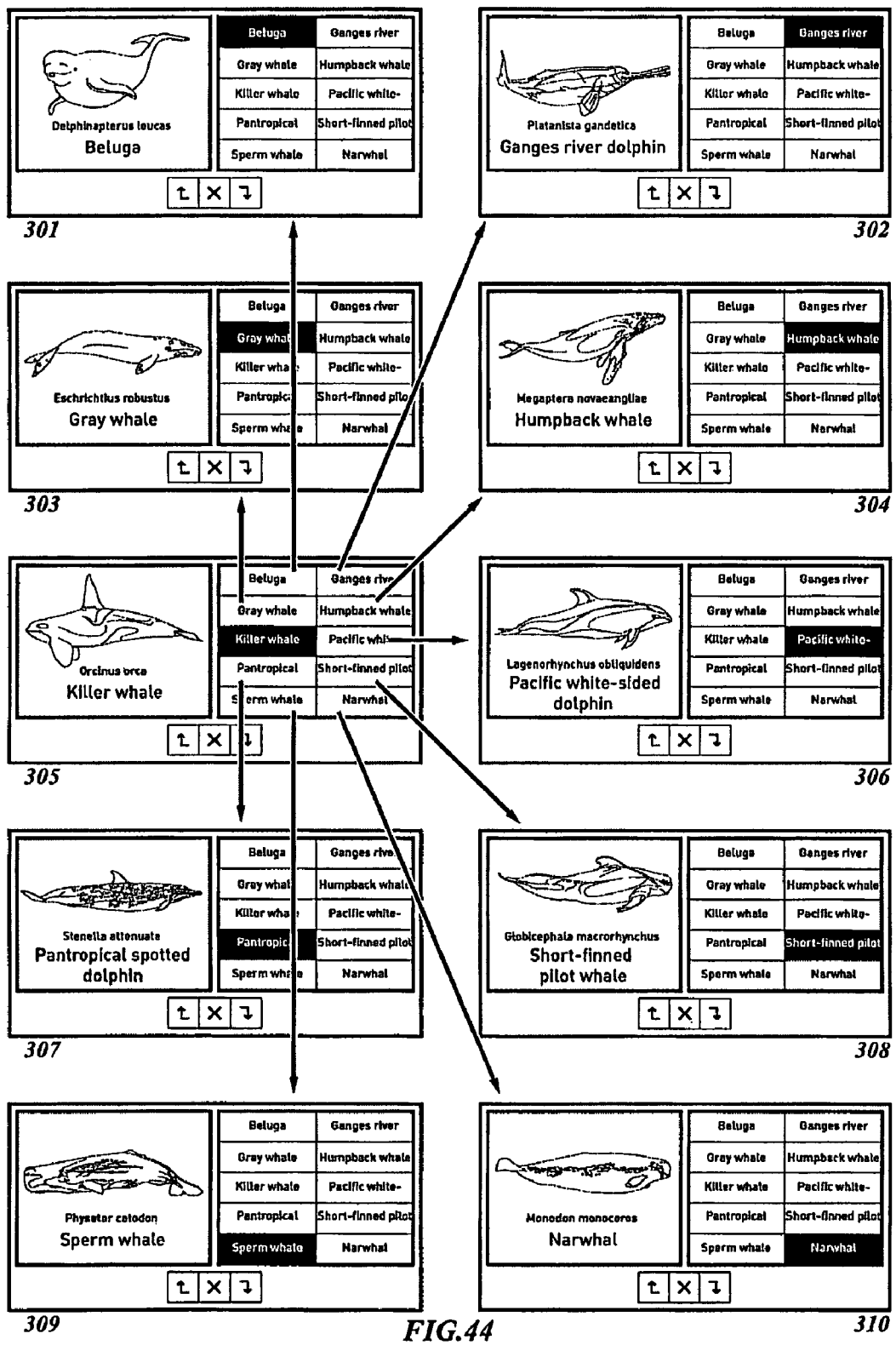
FIG. 25 shows a plurality of screenshots corresponding to the screen layout of FIG. 5, and the way in which these screenshots inter-relate to one another, when the screen layouts are used with an example information source and directory structure.

FIG. 23 also shows a series of screenshots relating to user selection of previews from the "mammal" directory. This figure illustrates how it is possible to select a preview (e.g. the primates preview, as shown) to get a sub-menu, but then choose another option from the parent menu to replace the sub-menu with a different preview. The "cetacea" preview and sub-menu are chosen in place of the "primates" sub-menu. FIG. 24 shows a similar situation, but gives the example of navigating from the "cetacea" sub-menu back to the "Xenarthra" preview and sub menu. FIG. 25 shows a plurality of navigation routes starting from the "cetacea" menu of the hierarchy in FIG. 2, with the "killer whale" menu item initially selected.

Figure 26A:
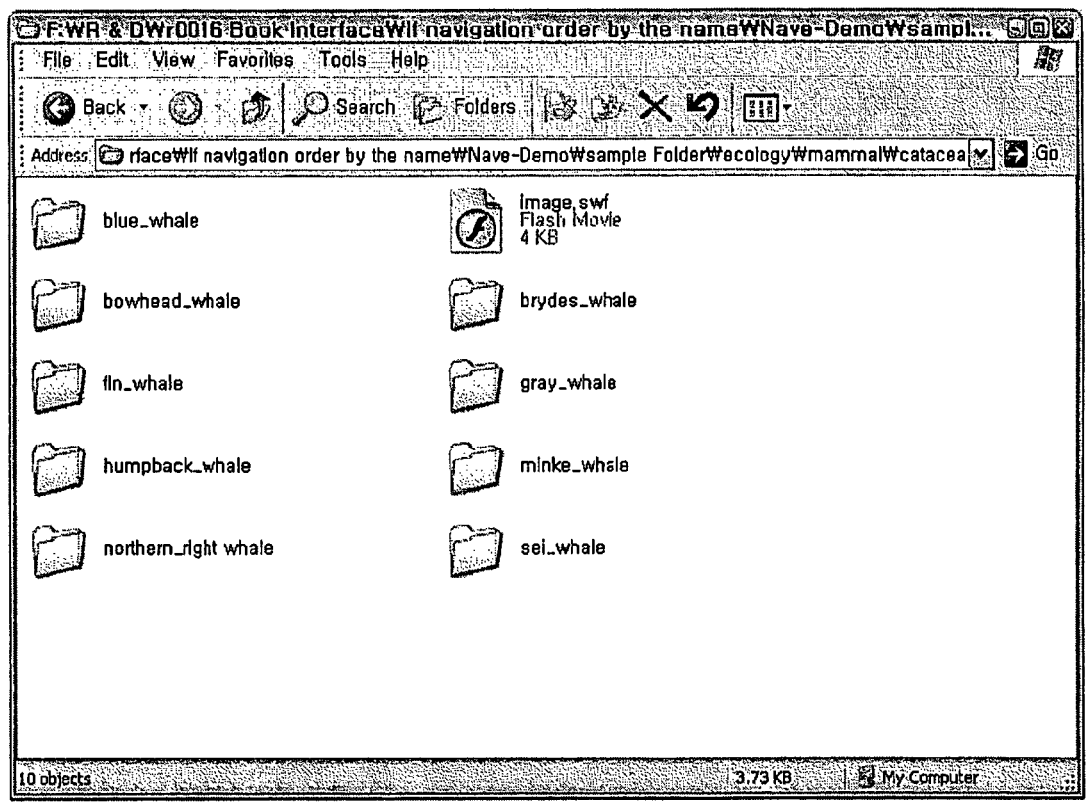
FIGS. 26a and 26b are computer screenshots displaying part of a directory structure which corresponds to the hierarchical information structure in one embodiment of the invention.

FIG. 26a is a computer screenshot showing an example of how the information store may be stored in the form of directories and subdirectories in a computer file system, with a structure corresponding to the structure of the information hierarchy. This example shows the contents of a directory labelled "Cetacea". This is not the "Cetacea" directory of FIG. 2, but a separate example. The "Cetacea" directory has nine sub-directories, labelled "blue_whale", "bowhead_whale", "fin_whale", "humpback_whale", "northern_right whale", "brydes_whale", "gray_whale", "minke_whale" and "sei_whale". The "Cetacea" directory also contains a file, with filename "image.swf", which is a Flash movie file. During navigation of the directory structure, in an embodiment of the invention, the "image.swf" file may be automatically played when navigation to the "Cetacea" directory is selected by a user.

Figure 26B:
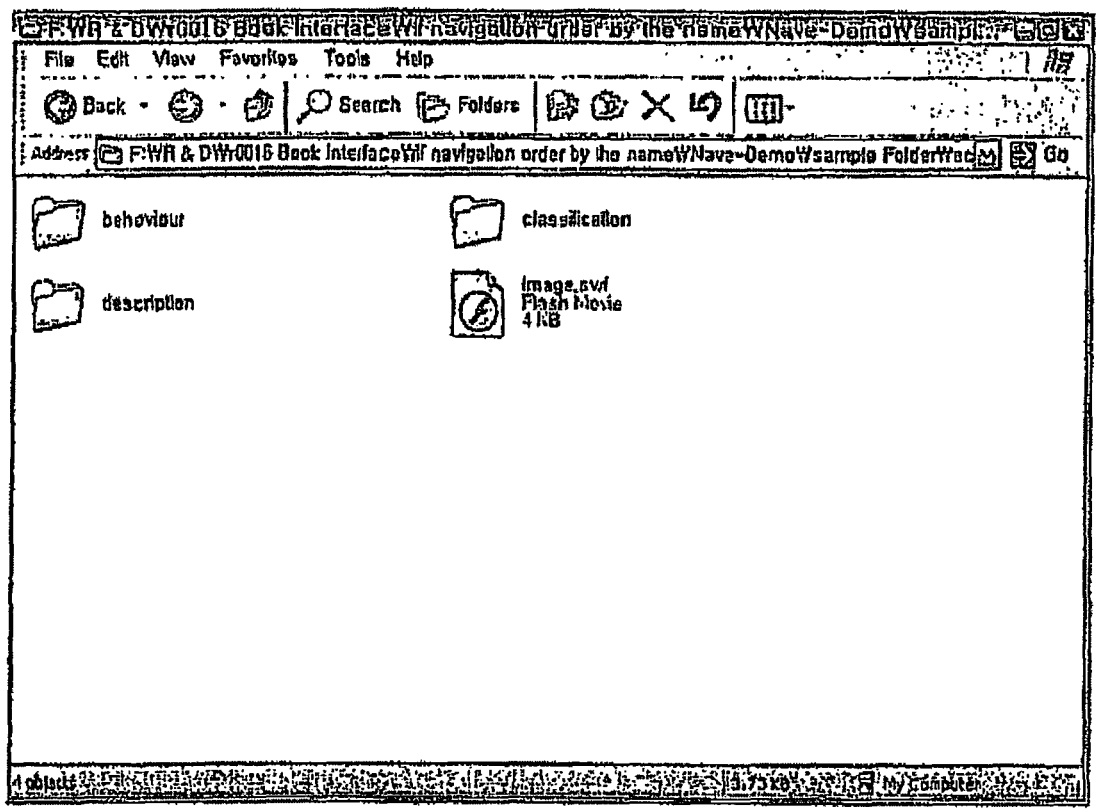

FIG. 26b is a computer screenshot showing the contents of the "blue_whale" subdirectory. This subdirectory contains three further subdirectories, labelled "behaviour", "classification" and "description". It also contains a Flash movie file, with filename "image.swf". During navigation of the directory structure, this "image.swf" file may be automatically played when navigation to the "blue_whale" subdirectory is selected by a user. Likewise, other subdirectories may also contain a file, e.g. a Flash movie file or some other type of file, that can be automatically activated or displayed when a user selects navigation to that particular subdirectory.

One alternative way of organising the storage of information from the information source is to use filenames specifying the location of a particular file in the information hierarchy. In that case, files corresponding to more than one level of the information hierarchy, or even all of the files making up the information source, may be stored in a single directory, in one embodiment of the invention.

FIG. 27 shows the contents of a single directory, relating to an information source in an embodiment of the invention. The directory contains no subdirectories, but contains files corresponding to a plurality of levels of the information hierarchy. The filename of each file specifies where in the information hierarchy the file belongs. For example, the file labelled "ecology-image.swf" is a Flash movie file at the top level of the information hierarchy. It may be played automatically in some embodiments of the invention, when the user begins navigation at the top of the hierarchy, or navigates to the top of the hierarchy.

The Flash movie files "ecology-amphibians-image.swf", "ecology-amphibians-image.swf", "ecology-birds-image.swf", "ecology-fishes-image.swf", "ecology-insect-image.swf", "ecology-mammal-image.swf" and "ecology-plant-image.swf" each corresponding to a level of the information hierarchy that is immediately below the top level. For example, when a user chooses to navigate to the "Mammal" part of the information hierarchy, the "ecology-mammal-image.swf" file may automatically be played. The apparatus may also detect which files relate to the level immediately below "Mammal" in the hierarchy, by analysis of the filenames, and display these options to the user for further navigation. For example, "ecology-mammal-carnivore-image.swf" is directly below "Mammal" in the information hierarchy, but "ecology-mammal-cetacea-blue_whale-image.swf" is two levels below, and thus would not be displayed as an immediate navigation option in preferred embodiments of the invention.

As can be seen from the above example, a separator such as "-" may be used in the filename to indicate the separation between different parts of the filename corresponding to different levels of the information hierarchy. Alternative separators may be used instead, such as any selected character or character group that is not required for normal use within each part of the filename. Alternatively, a fixed length may be allocated to each part of the filename, to eliminate the need for a separator.

Figure 28:
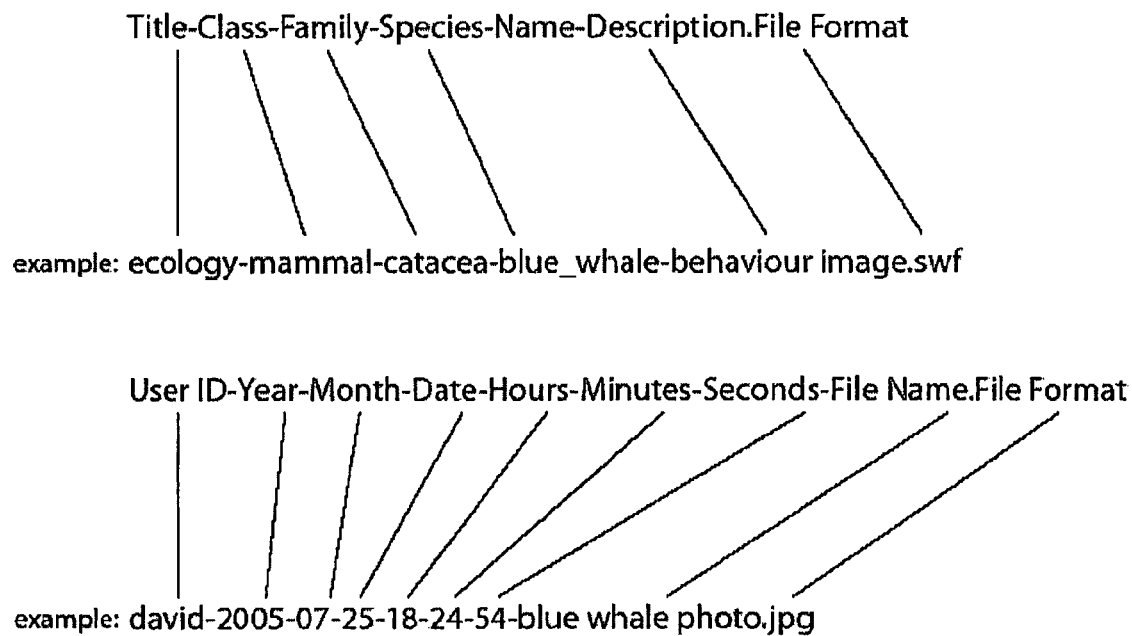
FIG. 28 shows examples of how a filename can be used to define the location of a file within an information hierarchy.

FIG. 28 shows examples of how a filename can be broken down into parts, and used to define the location of the file within an information hierarchy. The first example relates to the filename "ecology-mammal-cetacea-blue_whale-behaviour-image.swf". The figure indicates how the dashes act as separators, and how the first part "ecology" relates to the title, the second part "mammal" relates to the class, the third part "cetacea" relates to the family, the fourth part "blue_whale" relates to the species name, the fifth part "behaviour" relates to the description, and the sixth part "image.swf" relates to the file format.

The second example of FIG. 28 shows how this type of organisation of a hierarchical information source may be used to allow storage of a user's custom files, or storage of files relating to a particular date and time. Again, a dash is used as a separator, to indicate different levels of the hierarchy. In this example, the filename is "david-2005-07-25-18-24-54-blue whale photo.jpg", where "david" relates to the user ID, "2005" relates to the year, "07" relates to the month, "25" relates to the date (i.e. day of the month), "18" relates to the hour, "24" relates to the minute, "54" relates to the second, "blue whale photo" relates to the filename, and ".jpg" relates to the file format.

This second example illustrates how in some cases, it may be much more convenient to define a hierarchy using filenames or using a label or some sort of list, etc, rather than using an actual directory structure. If a separate directory was used for each individual minute and second, then most directories would contain only a single file. Thus, in certain embodiments, it may be more efficient in terms of file storage to use a labelling system, such as labelling position in the hierarchy with filename, rather than a multi-level directory system to define the structure of the information hierarchy.

Figure 29:
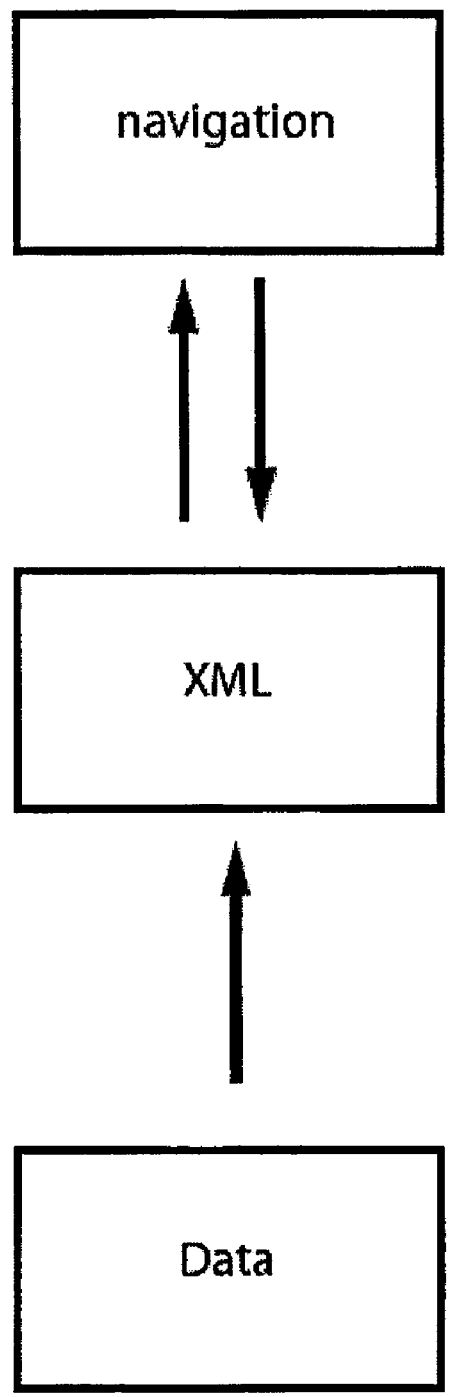
FIG. 29 is a schematic diagram indicating the data flow between a navigation interface, an XML processor and data from an information source, in an embodiment of the invention.

FIG. 29 is a schematic diagram indicating the data flow between a navigation interface, an XML processor and data from an information source, in an embodiment of the invention. Information relating to user selection from the information source is passed from the navigation interface to the XML processor. The XML processor then retrieves the appropriate information from the data store. The XML processor processes the information as and if required, e.g. by converting filenames corresponding to subnodes in the information hierarchy into text for displaying to the user. The XML processor then sends the information on to the navigation interface.

The embodiment of FIG. 29 may be used with information that is stored or accessed in any of a plurality of different ways, such as the folder system of FIG. 26A-B, the single directory system of FIG. 27, any system that stores information on the position in the hierarchy within each file or in a separate indexing system, or a system in which at least some of the information is dynamically generated as required and may be accessed in a manner analogous to any of the above file storage systems.

Embodiments similar to that of FIG. 29 may be implemented using an alternative computer language or computer code, instead of or as well as XML. For example, PHP or SQL may be used.

The present invention can be implemented in dedicated hardware, using a programmable digital controller suitably programmed, or using a combination of hardware and software. Thus the present invention can be embodied by any suitable carrier medium for carrying machine readable instructions for controlling a programmable controller. The carrier medium can comprise any storage medium such as a floppy disk, CD ROM, magnetic tape, or programmable memory device, or a transient medium such as an electrical, optical or acoustical signal. An example of such a signal is an encoded signal carrying a computer code over a communications network, e.g. a TCP/IP signal carrying computer code over an IP network such as the Internet, an intranet, or a local area network.

Although specific embodiments of the invention have been described, further modifications are also possible. The code for each process in the methods according to the invention may be modular, or may be arranged in an alternative way to perform the same function. The methods and apparatus according to the invention are applicable to any computer with display means, including a handheld device.

While the invention has been described in terms of what are at present its preferred embodiments, it will be apparent to those skilled in the art that various changes can be made to the preferred embodiments without departing from the scope of the invention, which is defined by the claims.

The invention claimed is:

1. Apparatus for displaying information from an information source, the information being indexed by a hierarchical directory structure, the apparatus comprising: at least one display for displaying information and user selectable menu items, each menu item corresponding to a directory of said directory structure or to information in the information source; a user input device for receiving user selections of displayed menu items; and a display controller for controlling said at least one display to provide a first display area for a first set of menu items and a second display area for a second set of menu items, to allow a user to navigate through at least part of the directory structure by selection of menu items to obtain information from the information source, wherein said display controller is configured to be able to display preview information corresponding to at least some of said menu items, and the display controller being configured such that during said navigation, in response to a user selection of a menu item from either one of the first or second display areas, if the selected menu item has preview information, the preview information is displayed in the other one of the first or second display areas, and a second user selection results in the preview information being replaced by a sub-set of menu items corresponding to directories or information at the level of the hierarchy below said selected menu item; and if the selected menu item does not have preview information, a sub-set of menu items corresponding to directories or information at the level of the hierarchy below said selected menu item is displayed in the other of the second or first display areas.

2. The apparatus of claim 1, wherein the display controller is configured to display said sub-set of menu items in the other of the second or first display areas at the same time as displaying the set of menu items including the selected menu item in said one of the first or second display areas.

3. The apparatus of claim 1, wherein said display controller is configured to display the selected menu item in said one of the first or second display areas in a highlighted manner.

4. The apparatus of claim 1, wherein said display controller is adapted to accept said second user selection as a user selection of the display area on which a preview of a menu item is displayed.

5. The apparatus as claimed in claim 1, wherein the display comprises a touch sensitive screen and the user input device comprises the input component of the touch sensitive screen.

6. The apparatus as claimed in claim 1, wherein a third display area is provided, and said previews are displayed in said third display area.

7. A storage medium carrying code for configuring a programmable apparatus as an apparatus for displaying information from an information source, the information being indexed by a hierarchical directory structure, the code comprising: code for displaying information and user selectable menu items on at least one display, each menu item corresponding to a directory of said directory structure or to information in the information source; code for receiving user selections of displayed menu items from a user input device; and code for controlling said at least one display to provide a first display area for a first set of menu items and a second display area for a second set of menu items, to allow a user to navigate through at least part of the directory structure by selection of menu items to obtain information from the information source, wherein said display controller is configured to be able to display preview information corresponding to at least some of said menu items, and the display controller being configured such that during said navigation, in response to a user selection of a menu item from either one of the first or second display areas: if the selected menu item has preview information, the preview information is displayed in the other one of the first or second display areas, and a second user selection results in the preview information being replaced by a sub-set of menu items corresponding to directories or information at the level of the hierarchy below said selected menu item; and if the selected menu item does not have preview information, a sub-set of menu items corresponding to directories or information at the level of the hierarchy below said selected menu item is displayed in the other of the second or first display areas.

8. A method of displaying information from an information source, the information being indexed by a hierarchical directory structure, the method comprising: displaying information and user selectable menu items on at least one display, each menu item corresponding to a directory of said directory structure or to information from the information source; receiving user selections of displayed menu items using a user input device; and controlling said at least one display to provide a first display area for a first set of menu items and a second display area for a second set of menu items, to allow a user to navigate through at least part of the directory structure by selection of menu items to obtain information from the information source, wherein at least some of said menu items have corresponding preview information, and during said navigation, to respond to a user selection of a menu item from either one of the first or second display areas, wherein if the selected menu item has preview information, displaying the preview information in the other one of the first or second display areas, and when a second user selection is received, replacing the preview information by a sub-set of menu items corresponding to directories or information at the level of the hierarchy below said selected menu item; and if the selected menu item does not have preview information, displaying a sub-set of menu items corresponding to directories or information at the level of the hierarchy below said selected menu item, in the other of said second or first display areas.

9. The method of claim 8, comprising displaying said sub-set of menu items in the other of the second or first display areas at the same time as displaying the set of menu items including the selected menu item in said one of the first or second display areas.

10. The method of claim 8, comprising displaying the selected menu item in said one of the first or second display areas in a highlighted manner.

11. The method of claim 8, wherein selection of the display area on which a said preview of a menu item is displayed comprises a second selection of the menu item.

12. A method as claimed in claim 8, comprising displaying information and menu items on a touch sensitive screen and accepting user selections from the input component of the touch sensitive screen.

13. A method as claimed in claim 8, wherein said previews are displayed in a third display area.

14. A method of displaying information to a user, comprising:

in a first display area, displaying a first level menu comprising a list of menu items corresponding to directories in a hierarchical directory structure;

after user selection of a directory, in a second display area displaying preview information corresponding to the selected directory;

after user selection of the preview information, displaying a second level menu with menu items corresponding to sub directories of the selected directory to replace the preview information;

after user selection of a sub-directory from the second display area, in the first display area displaying a third level menu with menu items corresponding to sub directories of the selected sub-directory.

15. A storage medium carrying code for controlling a programmable apparatus to carry out a method of displaying information from an information source, the information being indexed by a hierarchical directory structure, the code comprising: code for displaying information and user selectable menu items on at least one display, each menu item corresponding to a directory of said directory structure or to information from the information source; code for receiving user selections of displayed menu items using a user input device; and code for controlling said at least one display to provide a first display area for a first set of menu items and a second display area for a second set of menu items, to allow a user to navigate through at least part of the directory structure by selection of menu items to obtain information from the information source, wherein at least some of said menu items have corresponding preview information, and during said navigation, to respond to a user selection of a menu item from either one of the first or second display areas, wherein if the selected menu item has preview information, displaying the preview information in the other one of the first or second display areas, and when a second user selection is received, replacing the preview information by a sub-set of menu items corresponding to directories or information at the level of the hierarchy below said selected menu item; and if the selected menu item does not have preview information, displaying a sub-set of menu items corresponding to directories or information at the level of the hierarchy below said selected menu item, in the other of said second or first display areas.

16. Apparatus for displaying information from at least one information source, the information being arranged, labeled or indexed to define a hierarchical information structure, the apparatus comprising: a display controller for displaying information and user selectable menu items on at least one display, each menu item corresponding to a node of the information hierarchy or to information in the at least one information source; and a user input device for receiving user selections of displayed menu items; wherein the display controller is configured to control said at least one display to provide a first display area for a first set of menu items and a second display area for a second set of menu items, to allow a user to navigate through at least part of the information hierarchy by selection of menu items to obtain information from the information source, wherein said display controller is configured to be able to display preview information corresponding to at least some of said menu items, and the display controller is configured such that during said navigation, in response to a user selection of a menu item from either one of the first or second display areas, if the selected menu item has preview information, the preview information is displayed in the other one of the first or second display areas, and a second user selection results in the preview information being replaced by a sub-set of menu items corresponding to directories or information at the level of the hierarchy below said selected menu item; and if the selected menu item does not have preview information, a sub-set of menu items corresponding to sub-nodes or information in the information hierarchy at the level of the hierarchy below said selected menu item is displayed in the other of the second or first display areas.

17. The apparatus of claim 16, wherein the display controller is configured to display said sub-set of menu items in the other of the second or first display areas at the same time as displaying the set of menu items including the selected menu item in said one of the first or second display areas.

18. The apparatus of claim 16, wherein said display controller is configured to display the selected menu item in said one of the first or second display areas in a highlighted manner.

19. The apparatus of claim 16, wherein said display controller is adapted to accept said second user selection as a user selection of the display area on which a preview of a menu item is displayed.

20. The apparatus as claimed in claim 16, wherein a third display area is provided, and said previews are displayed in said third display area.

21. A storage medium carrying code for configuring a programmable apparatus as an apparatus for displaying information from at least one information source, the information being arranged, labeled or indexed to define a hierarchical information, the code comprising: code for displaying information and user selectable menu items on at least one display, each menu item corresponding to a node of the information hierarchy or to information in the at least one information source; code for receiving user selections of displayed menu items from a user input device; and code for controlling said at least one display to provide a first display area for a first set of menu items and a second display area for a second set of menu items, to allow a user to navigate through at least part of the information hierarchy by selection of menu items to obtain information from the information source, wherein said display controller is configured to be able to display preview information corresponding to at least some of said menu items, and the display controller is configured such that during said navigation, in response to a user selection of a menu item from either one of the first or second display areas, if the selected menu item has preview information, the preview information is displayed in the other one of the first or second display areas, and a second user selection results in the preview information being replaced by a sub-set of menu items corresponding to directories or information at the level of the hierarchy below said selected menu item; and if the selected menu item does not have preview information, a sub-set of menu items corresponding to sub-nodes or information in the information hierarchy at the level of the hierarchy below said selected menu item is displayed in the other of the second or first display areas.

22. Apparatus for displaying information from at least one information source, the information being arranged, labeled or indexed to define a hierarchical information structure, the apparatus comprising: display control means for controlling at least one display to display information and user selectable menu items, each menu item corresponding to a node of the information hierarchy or to information in the at least one information source; and user input means for receiving user selections of displayed menu items; wherein the display control means is configured to control said at least one display to provide a first display area for a first set of menu items and a second display area for a second set of menu items, to allow a user to navigate through at least part of the information hierarchy by selection of menu items to obtain information from the information source, wherein said display controller is configured to be able to display preview information corresponding to at least some of said menu items, and the display controller is configured such that during said navigation, in response to a user selection of a menu item from either one of the first or second display areas, if the selected menu item has preview information, the preview information is displayed in the other one of the first or second display areas, and a second user selection results in the preview information being replaced by a sub-set of menu items corresponding to directories or information at the level of the hierarchy below said selected menu item; and if the selected menu item does not have preview information, a sub-set of menu items corresponding to sub-nodes of the selected node in the information hierarchy or information at the level of the hierarchy below said selected menu item is displayed in the other of the second or first display areas.

23. Apparatus for displaying information from at least one information source, the apparatus comprising: a display controller for displaying information and user selectable menu items on at least one display, each menu item corresponding to information in the at least one information source; a user input device for receiving user selections of displayed menu items; and a display controller for controlling said at least one display to provide a first display area for a first set of menu items and a second display area for a second set of menu items, to allow a user to navigate through at least part of the directory structure by selection of menu items to obtain information from the at least one information source, wherein said display controller is configured to be able to display preview information corresponding to at least some of said menu items, and the display controller being configured such that during said navigation, in response to a user selection of a menu item from either one of the first or second display areas, if the selected menu item has preview information, the preview information is displayed in the other one of the first or second display areas, and a second user selection results in the preview information being replaced by a sub-set of menu items corresponding to directories or information at the level of the hierarchy below said selected menu item; and if the selected menu item does not have preview information, a sub-set of menu items each corresponding to further information associated with the selected information is displayed in the other of the second or first display areas.

24. A method of displaying information from at least one information source, the information being arranged, labeled or indexed to define a hierarchical information structure, the method comprising: displaying information and user selectable menu items on at least one display, each menu item corresponding to a node of the information hierarchy or to information from the at least one information source; receiving user selections of displayed menu items using a user input device; and controlling said at least one display to provide a first display area for a first set of menu items and a second display area for a second set of menu items, to allow a user to navigate through at least part of the information hierarchy by selection of menu items to obtain information from the information source, wherein at least some of said menu items have corresponding preview information, and during said navigation, to respond to a user selection of a menu item from either one of the first or second display areas, wherein if the selected menu item has preview information, displaying the preview information in the other one of the first or second display areas, and when a second user selection is received, replacing the preview information by a sub-set of menu items corresponding to directories or information at the level of the hierarchy below said selected menu item; and if the selected menu item does not have preview information, to-displaying a sub-set of menu items corresponding to sub-nodes of the selected node in the information hierarchy or information at the level of the hierarchy below said selected menu item, in the other of said second or first display areas.

25. A method of displaying information from at least one information source, the method comprising: displaying information and user selectable menu items on at least one display, each menu item corresponding to information from the at least one information source; receiving user selections of displayed menu items using a user input device; and controlling said at least one display to provide a first display area for a first set of menu items and a second display area for a second set of menu items, to allow a user to navigate through at least part of the information hierarchy by selection of menu items to obtain information from the at least one information source, wherein at least some of said menu items have corresponding preview information, and during said navigation, to respond to a user selection of a menu item from either one of the first or second display areas, wherein if the selected menu item has preview information, displaying the preview information in the other one of the first or second display areas, and when a second user selection is received, replacing the preview information by a sub-set of menu items corresponding to directories or information at the level of the hierarchy below said selected menu item; and if the selected menu item does not have preview information, displaying a sub-set of menu items corresponding to further information associated with the selected information, in the other of said second or first display areas.

* * * * *